(12) United States Patent
Kosegawa et al.

(10) Patent No.: US 9,164,624 B2
(45) Date of Patent: Oct. 20, 2015

(54) OPTICAL RECEIVING DEVICE AND OPTICAL TOUCH PANEL DEVICE PROVIDED WITH SAME

(75) Inventors: Seishi Kosegawa, Osaka (JP); Takehiro Murao, Osaka (JP); Toshiyuki Yoshimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 356 days.

(21) Appl. No.: 13/702,194

(22) PCT Filed: Jun. 6, 2011

(86) PCT No.: PCT/JP2011/062979
§ 371 (c)(1),
(2), (4) Date: Dec. 5, 2012

(87) PCT Pub. No.: WO2011/155466
PCT Pub. Date: Dec. 15, 2011

(65) Prior Publication Data
US 2013/0082982 A1  Apr. 4, 2013

(30) Foreign Application Priority Data
Jun. 8, 2010 (JP) .................................. 2010-131161

(51) Int. Cl.
*G06F 3/042* (2006.01)
(52) U.S. Cl.
CPC ............ *G06F 3/0421* (2013.01); *G06F 3/0428* (2013.01)

(58) Field of Classification Search
None
See application file for complete search history.

(56) References Cited

U.S. PATENT DOCUMENTS

2012/0099818 A1\* 4/2012 Shibata et al. .................. 385/33

FOREIGN PATENT DOCUMENTS

| JP | 2004-303172 A | | 10/2004 |
|----|---------------|---|---------|
| JP | 2004303172 A | \* | 10/2004 |
| JP | 2009-252012 A | | 10/2009 |

\* cited by examiner

*Primary Examiner* — David D Davis
(74) *Attorney, Agent, or Firm* — Chen Yoshimura LLP

(57) ABSTRACT

A light-receiving device 10 includes a plurality of light-receiving units 10A, 10B, and 10C, in which, in the element substrate 11A constituting the light-receiving unit 10A, the rear surface of a second terminal forming area 16Ac, upon which a connection pad PAc is formed, is bonded to the front surface of a cover glass 14B covering a plurality of light-receiving elements 12 constituting the light-receiving unit 10B, and in the element substrate 11C constituting the light-receiving unit 10C, the rear surface of a first terminal forming area 16Cb, upon which a connection pad PCb is formed, is bonded with the front surface of the cover glass 14B of the light-receiving unit 10B. As a result, an increase in manufacturing cost and a decrease in yield are mitigated so that it is possible to provide a light-receiving device upon which light-receiving elements are disposed continuously over a long distance at a high density, as well as an optical touch panel device provided with the same.

11 Claims, 10 Drawing Sheets (a)

(b)

(a)

(b)

(a)

(b)

OPTICAL RECEIVING DEVICE AND OPTICAL TOUCH PANEL DEVICE PROVIDED WITH SAME

TECHNICAL FIELD

The present invention relates to a light-receiving device that constitutes an optical touch panel device that detects an input position by detecting light, and an optical touch panel device provided with same.

BACKGROUND ART

Touch panels for large panels are currently being developed. For example, in the case of a touch panel for a large panel of approximately 65 inches, an optical touch panel is the main type used. Such an optical touch panel is disclosed in Patent Document 1 and Patent Document 2, for example.

FIG. 12 is a drawing that shows a configuration of an optical touch panel of Patent Document 1.

As shown in FIG. 12, an optical touch panel 200 has a light-emitting device 210, and a light-receiving device 220. The light-emitting device 210 has light-emitting elements 211, a substrate 212, and a lens L201. The light-emitting elements 211 are disposed in the periphery of a display surface 231 of a display device 230, and are constituted of LEDs or the like. The light-emitting elements 211 are installed on the substrate 212 substantially along one line.

The lens L201 for the light-emitting elements causes infrared light outputted from the light-emitting elements 211 to converge, and is provided between the light-emitting elements 211 and the display surface 231. The light-receiving device 220 has a lens L202 for light-receiving elements, light-receiving elements 221, and a substrate 222. The light-receiving elements 221 are disposed in the periphery of the display surface 231 of the display device 230, and are constituted of phototransistors or the like.

The light-receiving elements 221 are in the periphery of the display surface 231 of the display device 230, and are disposed facing the light-emitting elements 211 through a space 232 in the vicinity of (above or below) the display surface 231 of the display device 230. The light-emitting elements 211 output light, which passes through the lens L201, and the light-receiving elements 221 receive the light.

The infrared light emitted by the light-emitting elements 211 is caused to converge and is amplified by the lens L201, and then reaches the light-receiving elements 221 (phototransistors), which are placed far from the light-emitting elements 211. After the lens L202 causes the infrared light to converge again, the infrared light reaches the light-receiving surfaces of the light-receiving elements 221.

By providing the optical touch panel 200 with lenses L201 and L202 as stated above, a decrease in resolution of the optical touch panel is prevented.

FIG. 13(a) is a perspective view that shows a configuration of an optical touch panel according to Patent Document 2. FIG. 13(b) is a cross-sectional view of FIG. 13(a).

As shown in FIG. 13(a), the optical touch panel of Patent Document 2 is formed integrally with an electro-optical device 300 that has an image display function, and has a coordinate input function on the display surface thereof.

In the center of the electro-optical device 300, a coordinate input region 302, which is a display surface that displays images and that functions as a touch panel surface, is formed.

Light sources 310 and light-emitting side reflective plates 350 are disposed in light-emitting side periphery regions 303, which are in the vicinity of the coordinate input region 302. Light detectors 320 and light-receiving side reflective plates 360 are disposed in light-receiving side periphery regions 304, which are in the vicinity of the coordinate input region 302. The light detectors 320 are provided with a plurality of light-receiving elements, and are formed on an element substrate.

When the light emitted from the light source 310 reaches the light-emitting side reflective plate 350, the light-emitting side reflective plate 350 reflects the light, and the light travels parallel to the substrate surface towards the coordinate input region 302. The light that travels through the space above the coordinate input region 302 is reflected by the light-receiving side reflective plate 360 and reaches the light-receiving elements of the light detector 320.

In the electro-optical device 300, which is configured as stated above, a position indicated by touching the coordinate input region 302 with a finger or an input stylus is received as input data by the light detectors 320.

RELATED ART DOCUMENTS

Patent Documents

Patent Document 1: Japanese Patent Application Laid-Open Publication "Japanese Patent Application Laid-Open Publication No. 2009-252012 (published Oct. 29, 2009)"

Patent Document 2: Japanese Patent Application Laid-Open Publication "Japanese Patent Application Laid-Open Publication No. 2004-303172 (published Oct. 28, 2004)"

SUMMARY OF THE INVENTION

Problems to be Solved by the Invention

The light-receiving device 220 of the optical touch panel 200 of Patent Document 1 is provided externally to the display device 230. The light-receiving device 220 is provided with a plurality of light-receiving elements 221 on one substrate 222, and therefore, if the number of light-receiving elements 221 is increased in order to provide a larger or higher resolution display, the yield decreases.

In addition, if lenses L201 and L202 are provided for all light-emitting elements 211 and all light-receiving elements 221 as in the optical touch panel 200, the cost of materials increases, thus resulting in the problem that the manufacturing cost is high.

Even in the case of the optical touch panel of Patent Document 2 in which the light-receiving elements are formed integrally with the element substrate, the yield decreases if the number of light-receiving elements is increased in order to provide a larger or higher resolution display, as in the optical touch panel 200 of Patent Document 1.

The present invention is made in view of the above-mentioned problems, and an object thereof is to provide a light-receiving device that is provided with light-receiving elements disposed continuously over a long distance at a high density, and an optical touch panel device provided therewith, while mitigating increases in manufacturing cost and decreases in yield.

Means for Solving the Problems

In order to solve the above-mentioned problems, a light-receiving device of the present invention includes a plurality of light-receiving units, wherein each of the plurality of light-receiving units has: a plurality of light-receiving elements; first and second terminal forming regions respectively provided for forming first and second connection terminals for connecting first and second circuits to the plurality of light-receiving elements, respectively; and a light-receiving element forming region disposed between the first and second terminal forming regions, the light-receiving element forming region being provided for forming the plurality of light-receiving elements, wherein each of the plurality of light-receiving units is provided with a substrate and a protective member, wherein the plurality of light-receiving elements and the first and second connection terminals are formed on a front surface of the substrate, wherein the protective member is disposed so as to cover the plurality of light-receiving elements, and wherein a rear surface of the first or second terminal forming region in the substrate of one of the light-receiving units and a front surface of the protective member of a light-receiving unit that is different from the aforementioned one of the light-receiving units are bonded together.

According to the above-mentioned configuration, the respective plurality of light-receiving units are constituted of first and second terminal forming regions for respectively forming first and second connection terminals for connecting the plurality of light-receiving elements to first and second circuits, respectively, and a light-receiving element forming region that is disposed between the first and second terminal forming regions and that is provided for forming the plurality of light-receiving elements.

With this configuration, the plurality of light-receiving elements are formed in the light-receiving element forming region, and a first connection terminal and a second connection terminal are formed in a first terminal forming region and a second terminal forming region, respectively. Thus, the plurality of light-receiving elements and the first and second circuits can be connected. With this configuration, the driving of the light-receiving element groups can be controlled and the output from the light-receiving element groups can be controlled based on first and second control circuits.

According to the above-mentioned configuration, the protective member is disposed so as to cover the plurality of light-receiving elements formed on the front surface of the substrate, and thus, it is possible to protect the plurality of light-receiving elements.

According to the above-mentioned configuration, of the substrates of the light-receiving units, the rear surface of the first or second terminal forming region and the front surface of the protective member of another light-receiving unit are bonded together. The first and second terminal forming regions are disposed with the light-receiving element forming region therebetween.

Thus, it is possible to dispose the respective light-receiving element forming regions so as to be adjacent to each other when viewing the plurality of light-receiving units bonded to each other from a plan view, and therefore it is possible to dispose the plurality of light-receiving elements formed in the respective light-receiving element forming regions so as to be adjacent. Thus, it is possible to dispose the plurality of light-receiving elements continuously over a long distance.

Because the plurality of light-receiving units are bonded together, even if the number of light-receiving elements formed increases by disposing the light-receiving elements continuously over a long distance, the yield can be prevented from decreasing compared to a case in which the same number of light-receiving elements are formed without bonding together the light-receiving units.

The above-mentioned configuration is constituted of the plurality of light-receiving units, and a light-receiving element group is formed for each of the plurality of light-receiving units. With this configuration, light-receiving elements are formed at a high density on each of the plurality of light-receiving units and light-receiving units in which the light-receiving elements are formed at a high density are bonded to each other, thus forming a light-receiving device in which light-receiving elements are formed at a high density while mitigating a decrease in yield.

Also, because it is possible to dispose the light-receiving elements at a high density as stated above, a decrease in resolution can be mitigated without disposing a member such as a lens to cover the light-receiving surfaces of all of the light-receiving elements, for example. Thus, it is possible to prevent the manufacturing cost from being greater than when a member such as a lens is disposed to cover the light-receiving surfaces of all of the light-receiving elements.

Effects of the Invention

The light-receiving device of the present invention includes a plurality of light-receiving units, wherein each of the plurality of light-receiving units has: a plurality of light-receiving elements; first and second terminal forming regions respectively provided for forming first and second connection terminals for connecting first and second circuits to the plurality of light-receiving elements, respectively; and a light-receiving element forming region disposed between the first and second terminal forming regions, the light-receiving element forming region being provided for forming the plurality of light-receiving elements, wherein each of the plurality of light-receiving units is provided with a substrate and a protective member, wherein the plurality of light-receiving elements and the first and second connection terminals are formed on a front surface of the substrate, wherein the protective member is disposed so as to cover the plurality of light-receiving elements, and wherein a rear surface of the first or second terminal forming region in the substrate of one of the light-receiving units and a front surface of the protective member of a light-receiving unit that is different from the aforementioned one of the light-receiving units are bonded together.

With this configuration, it is possible to provide a light-receiving device provided with light-receiving elements at a high density and continuously over a long distance, and an optical touch panel device provided therewith, while mitigating an increase in manufacturing cost and a decrease in yield.

DETAILED DESCRIPTION OF EMBODIMENTS

Embodiment 1

Figure 1:
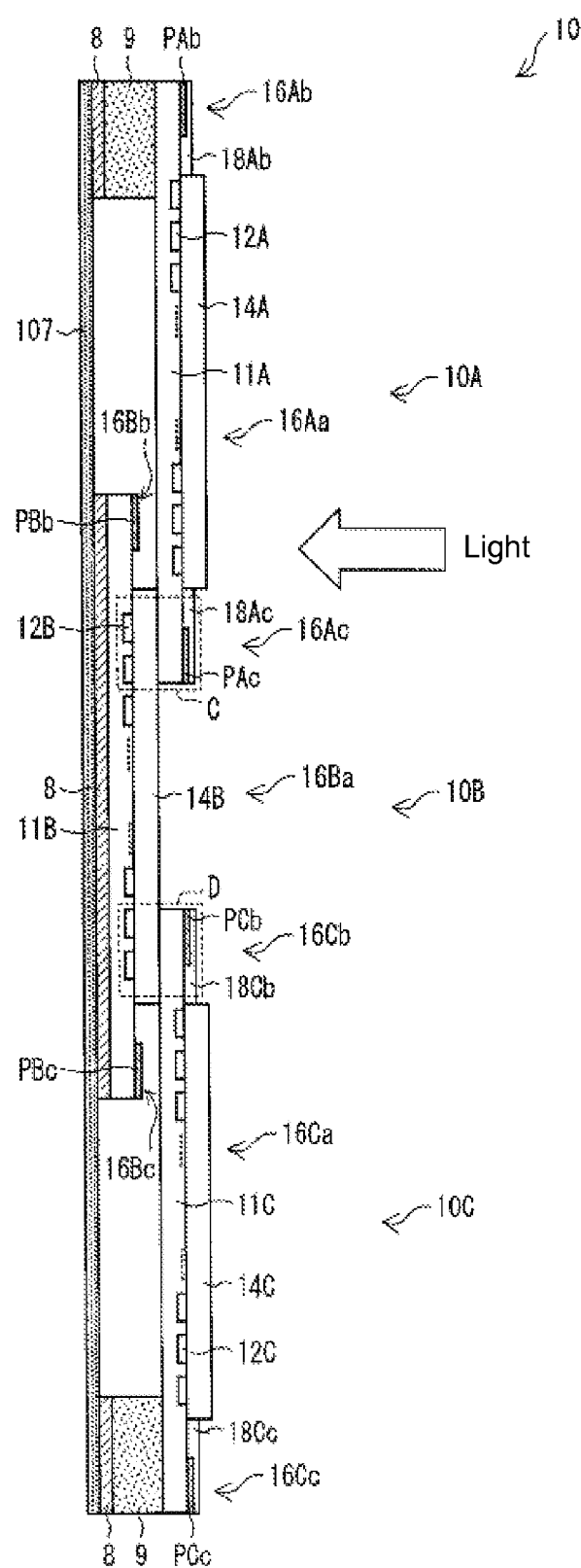
FIG. 1 is a cross-sectional view that shows a configuration of a light-receiving device according to Embodiment 1 of the present invention.

An embodiment of the present invention will be described in detail below.

(Schematic Configuration of an Optical Touch Panel Device)

FIG. 2(a) is a perspective view that shows an image display surface of an optical touch panel device 100 according to the present embodiment, and FIG. 2(b) is a cross-sectional view of FIG. 2(a) along the line A-B.

As shown in FIG. 2(a), the optical touch panel device 100 is provided with a display panel 101, light sources 5, and light-receiving devices 10.

The display panel 101 is an image display panel in general use such as a liquid crystal display panel or an organic EL (electroluminescence) display panel, and in particular, a large, approximately 65 inch image display panel. In describing the present embodiment, the display panel 101 is assumed to be a liquid crystal display panel.

The front surface of the display panel 101 is an image display surface that includes an image display region for displaying images. The image display region is also a coordinate input region 102 that receives tactile input from a stylus, a finger, or the like by the user in order to input coordinates to the display panel 101.

The coordinate input region 102 (image display region) has a plurality of pixels, which are not shown in the drawings, arranged in a matrix form, and the display panel 101 can display images using the plurality of pixels.

The light sources 5 and the light-receiving devices 10 are arranged along the periphery of the display panel 101, adjacent thereto.

The light sources 5 are disposed in light-emitting side periphery regions, which are regions located along the periphery of the coordinate input region 102. Also, the light-receiving devices 10 are disposed in the light-receiving side periphery regions located along the periphery of the coordinate input region 102, and face the light-emitting side periphery regions via the coordinate input region 102. The region that is surrounded by the light-emitting side periphery regions and the light-receiving side periphery regions is the coordinate input region 102 (image display region) of the display panel 101.

The light sources 5 and the light-receiving devices 10 form pairs and detect the coordinates at which a coordinate indicating member such as a stylus has come into contact with the coordinate input region 102.

In the optical touch panel device 100, a pair constituted of the light source 5 and the light-receiving device 10 for detecting an X direction coordinate and a pair constituted of the light source 5 and the light-receiving device 10 for detecting a Y direction coordinate are disposed in the periphery of the coordinate input region 102.

In the light source 5, a plurality of optical elements such as LEDs are arranged in a line, for example. The light-receiving device 10 is constituted of a plurality of light-receiving units 10A, 10B, and 10C bonded together, as will be described below. The light-receiving units 10A, 10B, and 10C each have a plurality of light-receiving elements 12 such as photodiodes arranged in a line or a plurality of lines. Details of the configuration of the light-receiving device 10 will be described below.

As shown in FIG. 2(b), the optical touch panel device 100 is additionally provided with a bezel 107, and the display panel 101 is stored within the bezel 107. The bezel 107 has an opening in the region that faces the coordinate input region 102 of the display panel 101, which allows the user to view images displayed in the coordinate input region 102 of the display panel 101 or to bring an indicating member such as a stylus or a finger for inputting coordinates into contact with the coordinate input region 102.

Also, the bezel 107 is provided with an edge part 107a that covers the light sources 5 and the light-receiving surfaces 12a of the light-receiving elements 12. The inner surface of the edge part 107a (the surface of the edge part 107a on the side that faces the light source 5 and the light-receiving surface 12a of the light-receiving element 12) is provided with a reflective plate for reflecting light. The reflective plate covering the light source 5 is referred to as a light-emitting side reflective plate 105, and the reflective plate covering the light-receiving surface 12a of the light-receiving element 12 is referred to as a light-receiving side reflective plate 110.

In the optical touch panel device 100, the direction that the light is emitted from the light source 5 is perpendicular to the image display surface of the display panel 101, and the light-receiving surfaces 12a of the plurality of light-receiving elements 12 of the light-receiving device 10 are disposed parallel to the image display surface of the display panel 101.

The light-emitting side reflective plate 105 covers the light-emitting surface of the light source 5 and is provided so as to extend in the direction that the light-emitting elements are aligned. The light-receiving side reflective plate 110 covers the light-receiving surfaces 12a of the light-receiving elements 12 of the light-receiving device 10, and is provided so as to extend in the direction that the plurality of light-receiving elements 12 are aligned.

The light-emitting side reflective plate 105 and the light-receiving side reflective plate 110 are made of a material with a high reflectance such as aluminum or glass, and are provided so as to be at an approximately 45° angle to the display surface of the display panel 101.

With this configuration, the light emitted from the light source 5 is reflected by the light-emitting side reflective plate 105 so as to travel parallel to the display surface of the display panel 101. The light that was emitted by the light source 5 and reflected by the light-emitting side reflective plate 105 is then reflected by the light-receiving side reflective plate 110 and received by the light-receiving element 12 of the light-receiving device 10.

When the user brings a stylus or the like in contact with the coordinate input region 102 of the display panel 101 in order to input coordinates to the optical touch panel device 100, the light emitted from the light source 5 is blocked by the stylus. The optical touch panel device 100 detects the X-direction and Y-direction coordinates of the position where the light is blocked using the light-receiving device 10, which allows the touch panel function to be realized.

As stated above, the light-receiving device 10 is constituted of the plurality of light-receiving units 10A, 10B, and 10C, which are bonded together. In addition, as will be described below, the light-receiving units 10A, 10B, and 10C are provided with light-receiving elements at a high density.

Because the plurality of light-receiving elements 12 are formed at a high density on each of the light-receiving units 10A, 10B, and 10C, which are bonded together, a decrease in yield can be mitigated and the touch position can be detected with a high resolution.

Also, the optical touch panel device 100 is provided with a light-receiving device 10 having the light-receiving elements 12 disposed continuously over a long distance, which allows the coordinate input region 102 that detects a touch position to be made large.

The optical touch panel device 100 is provided with the light-receiving device 10 in this manner, thus enabling a large 65 inch optical touch panel device 100 to be configured, and even if the user brings an indicating member with a relatively thin tip such as a stylus into contact with the coordinate input region 102, for example, the contact position of the indicating member can be detected accurately by the light-receiving device 10.

(Configuration of Light-receiving Device)

Next, the configuration of the light-receiving device 10 will be described with reference to FIGS. 1 and 2.

FIG. 1 is a cross-sectional view that shows a configuration of the light-receiving device 10 according to Embodiment 1.

As shown in FIG. 1, the light-receiving device 10 is provided with the plurality of light-receiving elements 12, the plurality of light-receiving units (first light-receiving unit, third light-receiving unit) 10A, light-receiving units (second light-receiving unit) 10B, and light-receiving units (third light-receiving unit, first light-receiving unit) 10C.

The light-receiving units 10A, 10B, and 10C are respectively constituted of first terminal forming regions 16Ab, 16Bb, and 16Cb, second terminal forming regions 16Ac, 16Bc, and 16Cc, and light-receiving element forming regions 16Aa, 16Ba, and 16Ca.

The first terminal forming regions 16Ab, 16Bb, and 16Cb are regions for forming the connection pads (first connection terminals) PAb, PBb, and PCb for connecting the first circuit to the plurality of light-receiving elements 12. The second terminal forming regions 16Ac, 16Bc, and 16Cc are regions for forming connection pads (second connection terminals) PAc, PBc, and PCc for connecting the second control circuit to the plurality of light-receiving elements 12.

The light-receiving element forming regions (sensor regions) 16Aa, 16Ba, and 16Ca are regions disposed between the first terminal forming regions 16Ab, 16Bb, and 16Cb, and the second terminal forming regions 16Ac, 16Bc, and 16Cc, and are regions for forming the plurality of light-receiving elements 12.

The light-receiving units 10A, 10B, and 10C are respectively provided with element substrates (substrates) 11A, 11B, and 11C, and sheets of cover glass (protective members) 14A, 14B, and 14C.

On the front surfaces of the element substrates (substrates) 11A, 11B, and 11C, light-receiving element groups 12A, 12B, and 12C constituted of a plurality of light-receiving elements 12 are formed on the light-receiving element forming regions 16Aa, 16Ba, and 16Ca, which are the central regions. In the first terminal forming regions 16Ab, 16Bb, and 16Cb, the connection pads PAb, PBb, and PCb are formed, and connection pads PAc, PBc, and PCc are formed in the second terminal forming regions 16Ac, 16Bc, and 16Cc.

The sheets of cover glass 14A, 14B, and 14C are formed so as to cover the light-receiving element groups 12A, 12B, and 12C. With this configuration, the sheets of cover glass 14A, 14B, and 14C can protect the light-receiving element groups 12A, 12B, and 12C. Members that cover the light-receiving element groups 12A, 12B, and 12C in this manner need only to protect the light-receiving element groups 12A, 12B, and 12C, and a transparent resin material may be used instead of the sheets of cover glass 14A, 14B, and 14C.

The rear surface of the second terminal forming region 16Ac of the element substrate 11A of the light-receiving unit 10A and the front surface of the cover glass 14B that covers the light-receiving element group 12B of the light-receiving unit 10B are bonded together.

Also, the rear surface of the first terminal forming region 16Cb of the element substrate 11C of the light-receiving unit 10C and the front surface of the cover glass 14B that covers the light-receiving element group 12B of the light-receiving unit 10B are bonded together.

The rear surface of the first terminal forming region 16Ab of the element substrate 11A of the light-receiving unit 10A and the rear surface of the second terminal forming region 16Cc of the element substrate 11C of the light-receiving unit 10C are each provided with a spacer 9. The spacers 9 and the rear surface of the element substrate 11B of the light-receiving unit 10B are provided with a RIM sheet (double-sided tape) 8. The light-receiving device 10 is bonded to the bottom surface of the inner side of the bezel 107 with the RIM sheet 8. The spacer 9 can be made of dummy glass, for example, and sets the height (distance from the bottom surface of the bezel 107) of the light-receiving units 10A and 10C.

Figure 2:
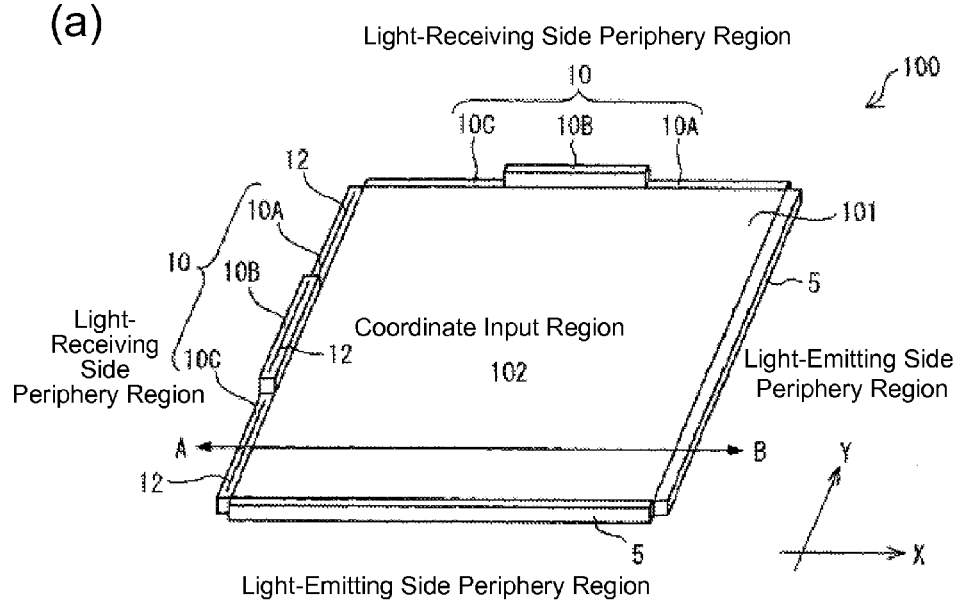
FIG. 2(a) is a perspective view that shows an image display surface of an optical touch panel device of the present invention.
FIG. 2(b) is a cross-sectional view of FIG. 2(a) along the line A-B.
Figure 2:
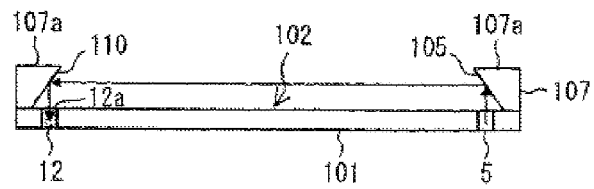

As shown in FIGS. 1 and 2, when viewing the light-receiving device 10 from a plan view, the light-receiving units 10A, 10B, and 10C are bonded to each other such that the light-receiving element groups 12A, 12B, and 12C form a straight line.

In each of the light-receiving element groups 12A, 12B, and 12C provided in the individual light-receiving units 10A, 10B, and 10C, a plurality of light-receiving elements 12 are provided in a line at a high density in the light-receiving element forming regions 16Aa, 16Ba, 16Ca. With this configuration, light-receiving units 10A, 10B, and 10C, which are provided with light-receiving elements 12 provided continuously over a long distance at a high density, are configured. Each of the light-receiving element groups 12A, 12B, and 12C is not limited to being formed in a line, and may be formed in a plurality of parallel lines.

In the light-receiving device 10, the respective light-receiving units 10A, 10B, and 10C have: the light-receiving element groups 12A, 12B, and 12C formed in the light-receiving element forming regions 16Aa, 16Ba, and 16Ca; the connection pads PAb, PBb, and PCb formed in the first terminal forming regions 16Ab, 16Bb, and 16Cb; and the connection pads PAc, PBc, and PCc formed in the second terminal forming regions 16Ac, 16Bc, and 16Cc. Thus, the light-receiving element groups 12A, 12B, and 12C, the first circuit, and the second circuit can be connected.

With this configuration, the driving of the light-receiving element groups 12A, 12B, and 12C can be controlled by the first circuit and the second circuit, and the output from the light-receiving element groups 12A, 12B, and 12C can be controlled.

Of the element substrate (substrate) 11A, the rear surface of the second terminal forming region 16Ac, which is one of the regions between which the light-receiving element forming region 16Aa is disposed, and the front surface of the cover glass 14B, which covers the light-receiving element group 12B of the light-receiving unit 10B, are bonded together. Of the element substrate 11C, the rear surface of the first terminal forming region 16Cb, which is one of the regions that sandwich the light-receiving element forming region 16Ca, and the front surface of the cover glass 14B, which covers the light-receiving element groups 12B of the light-receiving unit 10B, are bonded together.

Thus, the light-receiving element forming regions 16Aa, 16Ba, and 16Ca can be disposed adjacent to each other when viewing the light-receiving device 10 from a plan view. Therefore, it is possible to dispose the light-receiving element groups 12A, 12B, and 12C, which are formed on the respective light-receiving element forming regions, so as to be adjacent to each other and continuous.

As will be described below, the light-receiving units 10A, 10C, and 10B are bonded to each other such that the light-receiving element groups 12A and 12C disposed on the light-receiving units 10A and 10C, and the light-receiving element group 12B disposed on the light-receiving unit 10B are arranged in a line when viewing the light-receiving device 10 from a plan view. The plurality of light-receiving elements 12 are disposed in this manner in the light-receiving device 10 at a high density and continuously over a long distance.

The light-receiving element groups 12A and 12C, and the light-receiving element group 12B do not need to be in one line, and may be arranged in a plurality of lines. In other words, the light-receiving units 10A and 10C, and the light-receiving unit 10B simply need to be bonded to each other such that the light-receiving element groups 12A and 12C disposed on the light-receiving units 10A and 10C, and the light-receiving element group 12B disposed on the light-receiving unit 10B are aligned with an even gap therebetween, when viewing the light-receiving device 10 from a plan view.

In the light-receiving device 10, the light-receiving units 10A, 10B, and 10C are bonded together, and thus, even if the number of light-receiving elements 12 increases as a result of the light-receiving element groups 12A, 12B, and 12C being disposed over a long distance continuously, the yield can be prevented from decreasing compared to when the same number of light-receiving elements 12 is formed in the light-receiving device 10 without the light-receiving units being bonded together.

Also, the light-receiving device 10 is constituted of a plurality of light-receiving units 10A, 10B, and 10C, and a plurality of light-receiving elements 12 are formed on each of the plurality of light-receiving units 10A, 10B, and 10C. With this configuration, the light-receiving elements 12 are formed on each of the plurality of light-receiving units 10A, 10B, and 10C at a high density, and by bonding the light-receiving units 10A, 10B, and 10C, on which the light-receiving elements 12 are formed at a high density, to each other, a decrease in yield can be mitigated and it is possible to configure a light-receiving device 10 on which the light-receiving elements 12 are formed at a high density.

Figure 12:
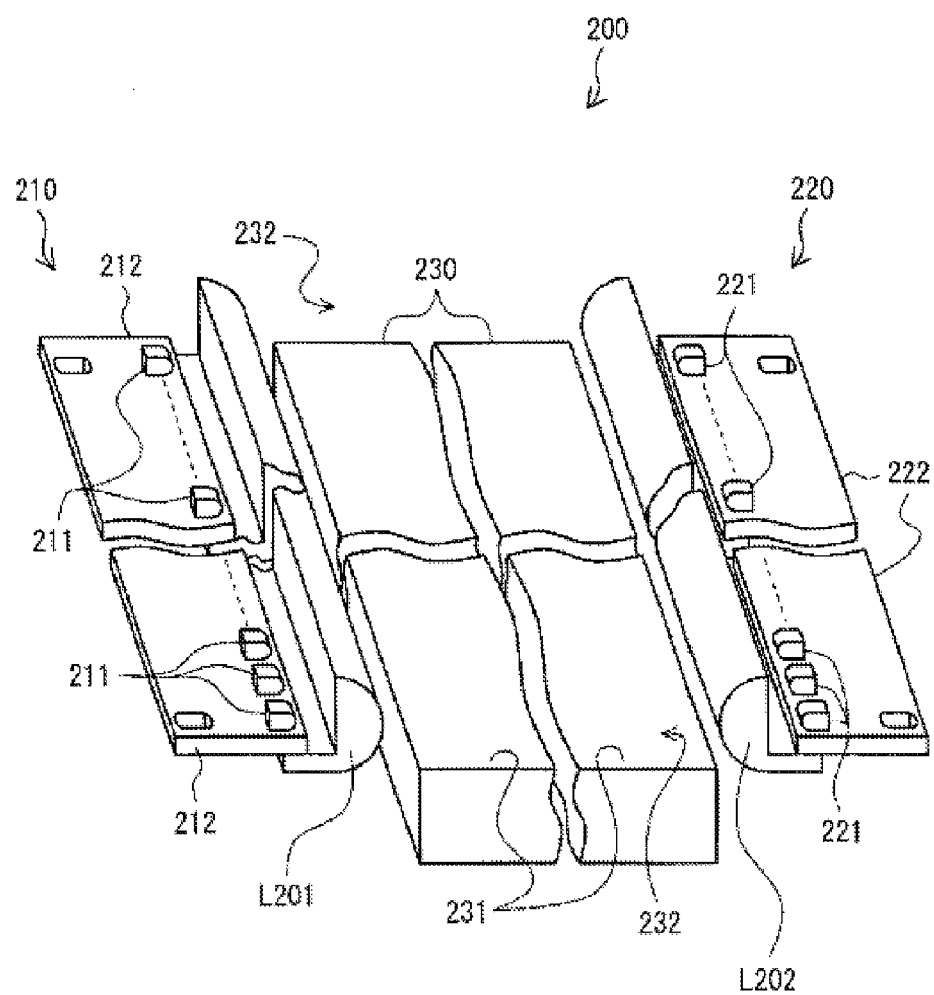
FIG. 12 is a drawing that shows a configuration of a conventional optical touch panel.
Figure 13:
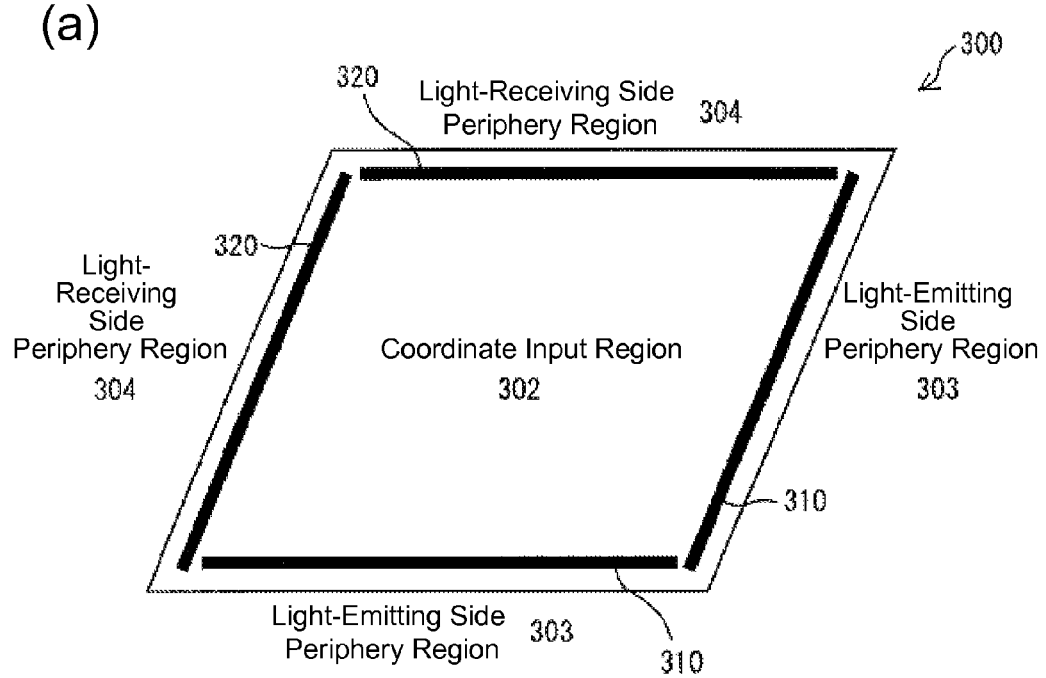
FIG. 13(a) is a perspective view that shows a configuration of a conventional optical touch panel.
FIG. 13(b) is a cross-sectional view of FIG. 13(a).
Figure 13:
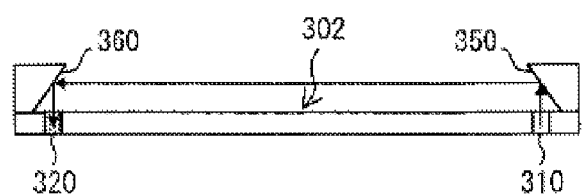

Also, since it is possible to dispose the light-receiving elements 12 at a high density, it is possible to mitigate a decrease in resolution without disposing a member such as a lens to cover the light-receiving surfaces of all of the light-receiving elements as in the optical touch panel 200 shown in FIG. 12, for example.

Thus, by using the light-receiving device 10 configured in this manner as a coordinate detection light-receiving device of an optical touch panel device 100 as described above, it is possible to mitigate an increase in manufacturing cost compared to when a member such as a lens is disposed to cover the light-receiving surfaces of all light-receiving elements as in the optical touch panel 200.

Also, while the optical touch panel device 100 is a large, approximately 65 inch display device, for example, the optical touch panel device 100 can detect the position of a stylus or the like that has come into contact even if the stylus or the like that has come in to contact with the coordinate input region 102 is relatively thin, and the position thereof can be detected at a high resolution.

Thus, the optical touch panel device 100 is particularly suitable as an optical touch panel provided in an electronic device that needs to detect the input position accurately and that needs to be a large display panel.

In addition, the light-receiving device 10 is made such that the amount of light entering the light-receiving elements 12 in the light-receiving unit 10B in the regions surrounded by the dotted lines C and D in FIG. 1 is maximized, thus preventing a sensing dead zone from forming in the regions surrounded by the dotted lines C and D. Details concerning this will be described below.

In addition, the first terminal forming region 16Ab and the second terminal forming region 16Ac of the light-receiving unit 10A are each provided with a lens 18Ab and a lens 18Ac, which are lenticular lenses or the like. With this configuration, the amount of light entering the light-receiving element group 12B disposed on the rear surface side of the first terminal forming region 16Ab and the second terminal forming region 16Ac of the element substrate 11A, can be increased. Thus, it is possible to mitigate a decrease in the amount of light received by the light-receiving element group 12B disposed on the rear surface of the element substrate 11A.

The first terminal forming region 16Cb and the second terminal forming region 16Cc of the light-receiving device 10C are also each provided with a lens 18Cb and a lens 18Cc, which are lenticular lenses or the like. With this configuration, the amount of light entering the light-receiving element group 12B disposed on the rear surface side of the first terminal forming region 16Cb and the second terminal forming region 16Cc of the element substrate 11C, can be increased. Thus, it is possible to mitigate a decrease in the amount of light received by the light-receiving element group 12B disposed on the rear surface of the element substrate 11C.

In the light-receiving device 10, the cover glass 14B of the light-receiving unit 10B and the rear surfaces of the element substrates 11A and 11C of the light-receiving units 10A and 10C are bonded together, and thus, the light-receiving surface of the light-receiving element groups 12A and 12C, and the light-receiving surface of the light-receiving element group 12B have different distances from the light source, thus resulting in the amount of light received differing.

When the optical touch panel device 100 is turned on, calibration is conducted in the light-receiving device 10 after the initial distribution of the amount of light received by each light-receiving element 12 in the light-receiving element groups 12A, 12B, and 12C is recorded. Then, when operating the optical touch panel device 100, the difference of the profile of the amount of light received by each light-receiving element 12 during operation and the distribution of the amount of light initially received is calculated, thus detecting whether or not a finger, a stylus, or the like is in contact with the touch panel. Therefore, the light-receiving device 10 can obtain an even light-receiving signal as a result of the light-receiving element groups 12A, 12B, and 12C, thus allowing accurate sensing.

Also, it is preferable that the light-receiving unit 10B be as thin as possible in order to minimize amount of space between the light-receiving units 10A and 10C and the bezel 107.

(Configuration of Light-Receiving Units)

Next, the configuration of the light-receiving units 10A, 10B, and 10C, which constitute the light-receiving device 10 will be described with reference to FIGS. 3(a) and 3(b). Also, while the configuration of the light-receiving unit 10A will be described based on FIGS. 3(a) and 3(b), descriptions of the light-receiving units 10B and 10C will be omitted since the configuration thereof is similar to that of the light-receiving unit 10A.

Figure 3:
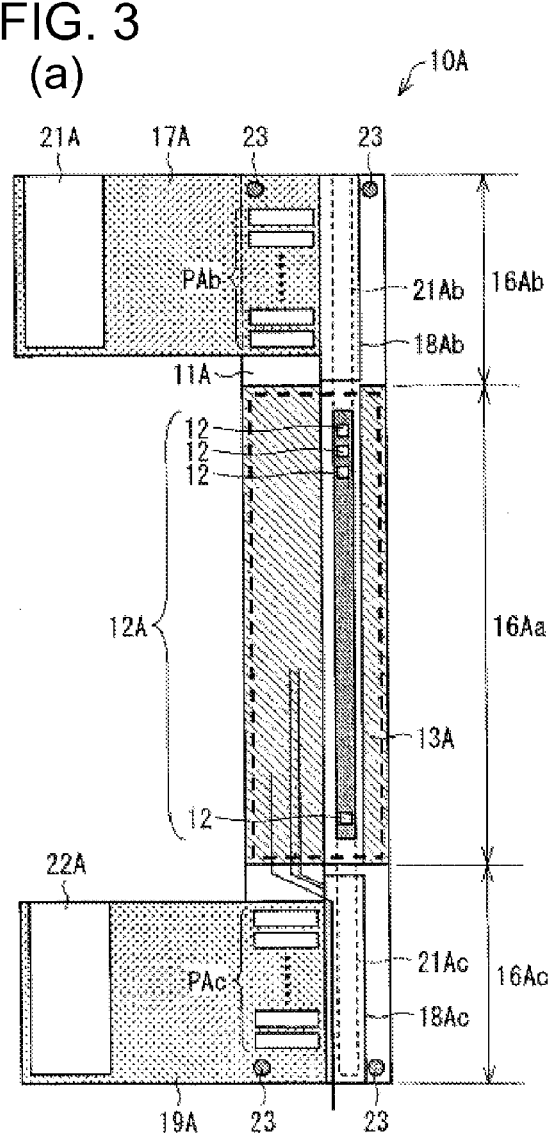
FIG. 3(a) is a plan view that shows a configuration of a light-receiving unit that constitutes a light-receiving device of the present invention.
FIG. 3(b) is a cross-sectional view that shows a configuration of the above-mentioned light-receiving unit.
Figure 3:
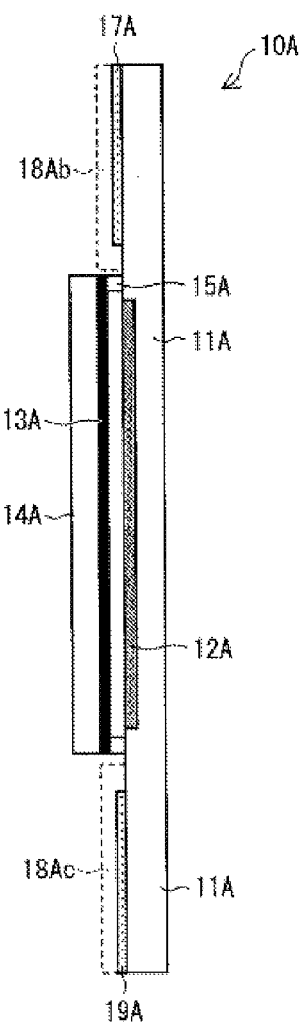

FIG. 3(a) is a plan view that shows the configuration of the light-receiving unit 10A, and FIG. 3(b) is a cross-sectional view that shows the configuration of the light-receiving unit 10A. In FIG. 3(b), the light enters from the left side of the page.

As shown in FIGS. 3(a) and 3(b), the light-receiving unit 10A is provided with an element substrate 11A, the light-receiving element group 12A constituted of a plurality of light-receiving elements 12, a resin BM (black matrix) 13A, and a cover glass 14A.

The element substrate 11A is made of glass (non-alkali glass or the like) or the like with a thickness of approximately 1.7 mm, for example. The central region of the element substrate 11A is provided with the light-receiving element group 12A provided with a plurality of light-receiving elements 12 arranged in one line. The light-receiving element 12 is made of a photodiode, for example.

The resin BM (black matrix) 13A is formed on the rear surface of the cover glass 14A, and is bonded to the element substrate 11A while being separated from the light-receiving element group 12A as a result of the protective seal 15A. The resin BM 13A is patterned on the rear surface of the cover glass 14A so as not to cover the individual light-receiving surfaces of the light-receiving element group 12A.

As shown in FIG. 3(a), the light-receiving unit 10A is constituted of a light-receiving element forming region 16Aa, which is a region provided with the light-receiving element group 12A in which a plurality of light-receiving elements 12 are arranged in a line, and a first terminal forming region 16Ab and a second terminal forming region 16Ac, which are regions in which terminals for external connections are formed.

Of the rear surface of the element substrate 11A, at least one of the first terminal forming region 16Ab and the second terminal forming region 16Ac is a region to be bonded to the front surface of the cover glass 14B (14C) of the other light-receiving unit 10B (10C).

When viewing the light-receiving unit 10A from a plan view, the long side direction of the element substrate 11A is the Y direction and the short side direction intersecting perpendicularly to the long side direction is the X direction. The light-receiving elements 12 are aligned in one line in the Y direction.

The length of the element substrate 11A in the X direction is approximately 3 mm, and the Y direction thereof is approximately 210 mm. The element substrate 11A is provided with the first terminal forming region 16Ab of approximately 5 mm, the light-receiving element forming region 16Aa of approximately 200 mm, and the second terminal forming region 16Ac of approximately 5 mm, aligned in this order in the Y direction.

In the light-receiving element forming region 16Aa, the plurality of light-receiving elements 12 are provided at a high density at regular intervals with a pitch of approximately 100 μm to 1000 μm, for example.

The resin BM 13A is formed in the periphery of the light-receiving element group 12A. By forming the resin BM 13A in this manner, it is possible to shield the light-receiving surfaces of the light-receiving element group 12A from light entering from the diagonal direction or the horizontal direction, thus preventing excess light from entering the light-receiving element group 12A. With this configuration, it is possible to increase the sensitivity of the light-receiving element groups 12A to light entering from the vertical direction.

One terminal of an FPC 17A, which is approximately 4.5 mm in width (Y direction length), is connected to the first terminal forming region 16Ab. This terminal of the FPC (flexible printed circuit) 17A is connected to the connection pads PAb, and the connection pads PAb are connected to output electrodes of the respective light-receiving elements 12. The other terminal of the FPC 17A is provided with an ADC (AD converter)-IC 21A, and the connection pads PAb and the ADC-IC 21A are connected to each other. The FPC 17A can connect to external elements via the ADC-IC 21A. With this configuration, when currents corresponding to the amounts of light received flow from the light-receiving element group 12A via the output electrodes, the ADC-IC 21A converts the currents to digital data and outputs it to external elements.

A terminal of an SOF (system on file) 19A of approximately 4.5 mm in width (Y direction length) is connected to the second terminal forming region 16Ac. This terminal of the SOF 19A is connected to the connection pads (connection terminals) PAc, and the respective connection pads PAc are connected to control electrodes of respective light-receiving elements 12. The other terminal of the SOF 19A is provided with a sensor control IC 22A, and the connection pads PAc and the sensor control IC 22A are connected in the SOF 19A. The SOF 19A can connect to external elements via the sensor control IC 22A. With this configuration, drive control can be conducted on the light-receiving element group 12A.

The second terminal forming region 16Ac of the light-receiving unit 10A is provided with a light-receiving element overlapping region 21Ac that is disposed adjacent to the connection pads PAc formed therein and that overlaps some of the light-receiving element group 12B of the light-receiving unit 10B.

Also, the first terminal forming region 16Ab of the light-receiving unit 10A is provided with a light-receiving element overlapping region 21Ab that is disposed adjacent to the connection pads PAb formed therein and that overlaps some of the light-receiving element group 12B of the light-receiving unit 10B.

When viewing the light-receiving device 10 from a plan view, the light-receiving unit 10A and the light-receiving unit 10B are bonded together such that some of the light-receiving element group 12B of the light-receiving unit 10B in the bonded region are included in at least one of the light-receiving element overlapping region 21Ab and the light-receiving element overlapping region 21Ac.

With this configuration, some of the light-receiving element group 12B of the light-receiving unit 10B overlaps with the light-receiving element overlapping region 21Ab or the light-receiving element overlapping region 21Ac so as to be adjacent to the connection pads PAb or the connection pads PAc of the light-receiving unit 10A, and thus, it is possible to dispose some of the light-receiving element group 12B of the light-receiving unit 10B without overlapping with the connection pads PAb or alternatively the connection pads PAc of the light-receiving unit 10A. With this configuration, it is possible to increase the amount of light received by the light-receiving element group 12B of the light-receiving unit 10B disposed in the light-receiving element overlapping regions 21Ab and 21Ac of the light-receiving unit 10A.

Similar to the light-receiving device 10 of FIG. 1, when bonding only the second terminal forming region 16Ac out of the first terminal forming region 16Ab and the second terminal forming region 16Ac of the light-receiving unit 10A to the other light-receiving unit 10B, the light-receiving element overlapping region 21Ab of the first terminal forming region 16Ab may be omitted.

The light-receiving element overlapping regions 21Ab and 21Ac are regions for including the light-receiving element group 12B of the light-receiving unit 10B from a plan view when bonding together the rear surface of the element substrate 11A of the light-receiving unit 10A and the cover glass 14B of the light-receiving unit 10B, which is different from the light-receiving unit 10A.

Thus, the area of the wiring lines entering the light-receiving element overlapping regions 21Ab and 21Ac is minimized.

Specifically, the light-receiving element overlapping regions 21Ab and 21Ac are configured such that (i) Y direction wiring lines do not enter the light-receiving element overlapping regions 21Ab and 21Ac, (ii) X direction wiring lines do necessarily enter but the width thereof is minimized, (iii) the wiring lines are disposed at regular intervals and bonded together, allowing light to enter the light-receiving element group 12B (12C) of the light-receiving unit 10B (10C) disposed on the rear surface side.

As described above, from a plan view, the wiring lines formed in the first terminal forming region 16Ab and the second terminal forming region 16Ac (overlapping part) of the light-receiving unit 10A are configured so as to avoid the light-receiving element group 12B (12C) of the light-receiving unit 10B (10C) disposed on the rear side, thus removing sensing dead zones in the first terminal forming region 16Ab and the second terminal forming region 16Ac. Details thereof will be described below.

Alignment marks 23 for patterning wiring lines for the light-receiving element group 12A and the like are formed in the four corners of the element substrate 11A.

Lenses (first lenses) 18Ab and 18Ac are disposed on the front surface of the element substrate 11A of the light-receiving unit 10A in the light-receiving element overlapping regions 21Ab and 21Ac. The lenses 18Ab and 18Ac are arranged so as to extend in the direction that the light-receiving element group 12A is aligned. The lenses 18Ab and 18Ac are lenticular lenses, for example. The lenses 18Ab and 18Ac are provided so as to include the light-receiving element overlapping regions 21Ab and 21Ac.

The lenses 18Ab and 18Ac can condense light and thus, it is possible to mitigate a decrease in the amount of light received by the light-receiving element group 12B of the light-receiving unit 10B provided in the light-receiving element overlapping regions 21Ab and 21Ac of the light-receiving unit 10A.

Next, a manufacturing method for the light-receiving unit 10A will be described.

The light-receiving unit 10A can be made through TFT processing by which general liquid crystal display panels are manufactured, for example.

The light-receiving element group 12A is formed on the element substrate 11A. The light-receiving element group 12A is made of photodiodes or the like, and can be made by the same process as the TFTs formed in the respective pixels as switching elements for each pixel of the display panel 101. When forming the light-receiving element group 12A on the element substrate 11A, wiring lines that connect the output electrodes of the light-receiving element group 12A to the connection pads PAb, wiring lines that connect control electrodes of the light-receiving element group 12A to the connection pads PAc, and the like are formed at the same time.

Next, the resin BM 13A is patterned on the rear surface of the cover glass 14A so as not cover the light-receiving element group 12A.

Next, the cover glass 14A, the rear surface of which has a resin BM 13A patterned thereon, is bonded to the element substrate 11A using the protective seal 15A. The cover glass 14A of the first terminal forming region 16Ab and the second terminal forming region 16Ac is cut.

Next, the connection pads PAb and PAc for connecting the FPC 17A and the SOF 19A are formed in the first terminal forming region 16Ab and the second terminal forming region 16Ac, respectively. The connection pads PAb, which are formed in the first terminal forming region 16Ab, are connected to the FPC 17A, and the SOF 19A is connected to the connection pads PAc formed in the second terminal forming region 16Ac.

It is possible to form the light-receiving unit 10A in this manner. Also, the light-receiving units 10B and 10C can be formed in a similar manner.

In the light-receiving device 10, the light-receiving element groups 12A, 12B, and 12C are respectively formed on the light-receiving units 10A, 10B, and 10C, which constitute the light-receiving device 10. The light-receiving device 10 is formed by bonding together the light-receiving units 10A, 10B, and 10C on which the light-receiving element groups 12A, 12B, and 12C are formed, thus mitigating a decrease in yield, and allowing the light-receiving elements 12 to be arranged at a high density and over a long distance.

(Wiring Lines that Connect the Light-receiving Elements to the Connection Pads)

Next, a method for decreasing the area of the wiring lines entering the light-receiving element overlapping regions 21Ab and 21Ac is described.

Figure 4:
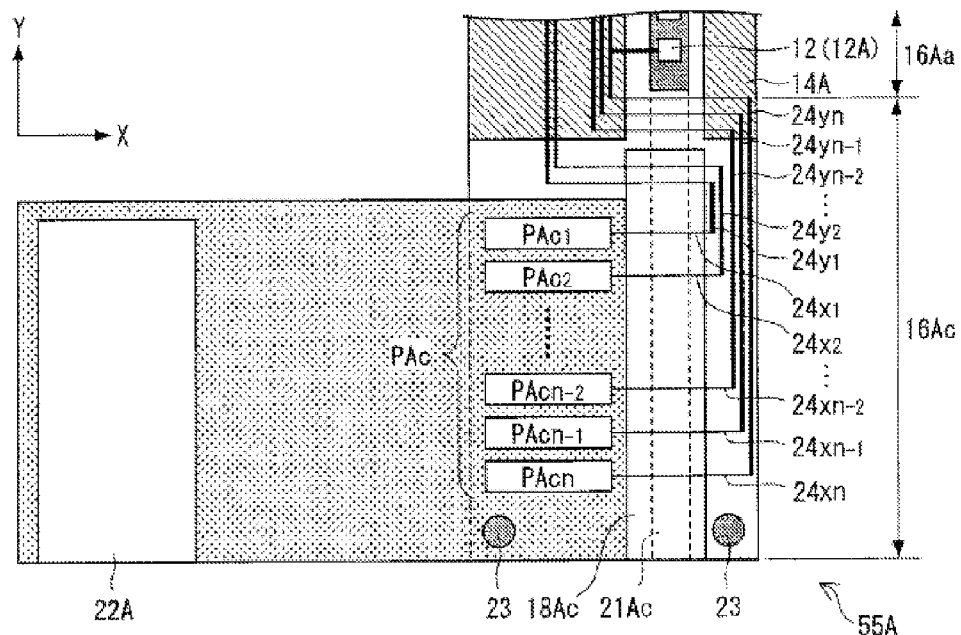
FIG. 4 is a drawing that shows a configuration of a second terminal forming region of the above-mentioned light-receiving unit.

First, using FIG. 4, a method for drawing out the wiring lines that connect the light-receiving element group 12A and the connection pads PAc for connecting to the SOF 19A is described.

FIG. 4 is a drawing that shows a configuration of the second terminal forming region 16Ac of the light-receiving device 10A.

The connection pads PAc are constituted of connection pads $PAc_1$, $PAc_2$, ... $PAc_{n-2}$, $PAc_{n-1}$, and $PAc_n$ aligned in that order in the Y direction.

Each of the connection pads $PAc_1$, $PAc_2$, ... $PAc_{n-2}$, $PAc_{n-1}$, and $PAc_n$ is connected to one terminal of respective light-receiving element control wiring lines (horizontal direction wiring lines) $24_{x1}$, $24_{x2}$, ... $24_{xn-2}$, $24_{xn-1}$, and $24_{xn}$.

The light-receiving element control wiring lines $24_{x1}$, $24_{x2}$, ... $24_{xn-1}$, and $24_{xn}$ extend in the X direction while crossing the light-receiving element overlapping region 21Ac and are aligned in the Y direction so as to be parallel.

The light-receiving element control wiring lines $24_{x1}$, $24_{x2}$, ... $24_{xn-1}$, $24_{xn}$ are formed so as to be thin at approximately 100 μm such that light enters the light-receiving element group 12B disposed in an overlapping manner on the rear surface side of the light-receiving element overlapping region 21Ac.

With this configuration, the light-receiving element control wiring lines $24_{x1}$, $24_{x2}$, ... $24_{xn-1}$, and $24_{xn}$ can be provided with a wide gap therebetween, and thus, it is possible to prevent a decrease in the sensitivity to received light of the light-receiving element group 12B disposed in an overlapping manner on the rear surface side of the light-receiving element overlapping region 21Ac.

The other terminal of the light-receiving element control wiring lines $24_{x1}$, $24_{x2}$, ... $24_{xn-2}$, $24_{xn-1}$, and $24_{xn}$ is respectively connected to the one terminal of light-receiving element control wiring lines (vertical direction wiring lines) $24_{y1}$, $24_{y2}$, ... $24_{yn-2}$, $24_{yn-1}$, and $24_{yn}$.

The light-receiving element control wiring lines $24_{y1}$, $24_{y2}$, ... $24_{yn-1}$, and $24_{yn}$ extend in the Y direction and aligned in the X direction so as to be parallel. In other words, each of the light-receiving element control wiring lines $24_{y1}$, $24_{y2}$, ... $24_{yn-1}$, and $24_{yn}$ is disposed adjacent to the light-receiving element overlapping region 21Ac, and extends in the direction that the light-receiving element overlapping region 21Ac extends.

With this configuration, each of the Y direction light-receiving element control wiring lines $24_{y1}$, $24_{y2}$, ... $24_{yn-1}$, and $24_{yn}$, which are wide, do not enter the light-receiving element overlapping region 21Ac.

The width of each of the light-receiving element control wiring lines $24_{y1}$, $24_{y2}$, ... $24_{yn-1}$, and $24_{yn}$ is approximately 50 μm to 500 μm and preferably greater than 100 μm and no greater than 500 μm, thus being wider than the light-receiving element control wiring lines $24_{x1}$, $24_{x2}$, ... $24_{xn-1}$, and $24_{xn}$. With this configuration, the resistance of the wiring lines can be decreased.

Where the respective light-receiving element control wiring lines $24_{y1}$, $24_{y2}$, ... $24_{yn-1}$, and $24_{yn}$, which extend from one of the terminals in the Y direction (Y plus direction), reach beyond the position of the side part of the SOF 19A, the width of the wiring lines becomes similar to that of the light-receiving element control wiring lines $24_{x1}$, $24_{x2}$, ... $24_{xn-1}$, and $24_{xn}$, and the light-receiving element control wiring lines $24_{y1}$, $24_{y2}$, ... $24_{yn-1}$, and $24_{yn}$ are disposed so as to bend in a direction so as to cross the light-receiving element overlapping region 21Ac again.

Each of the light-receiving element control wiring lines $24_{y1}$, $24_{y2}$, ... $24_{yn-1}$, and $24_{yn}$, which cross the light-receiving element overlapping region 21Ac, widens again to a width of approximately 50 μm to 500 μm and preferably greater than 100 μm and no greater than 500 μm, and extends in the Y direction connecting to the control electrode of each light-receiving element 12.

In this manner, of the wiring lines that are connected from the sensor control IC to the control electrodes of the light-receiving element group 12A in order to control the driving of the light-receiving elements 12, the wiring lines formed in the light-receiving element overlapping region 21Ac are relatively thin.

Figure 5:
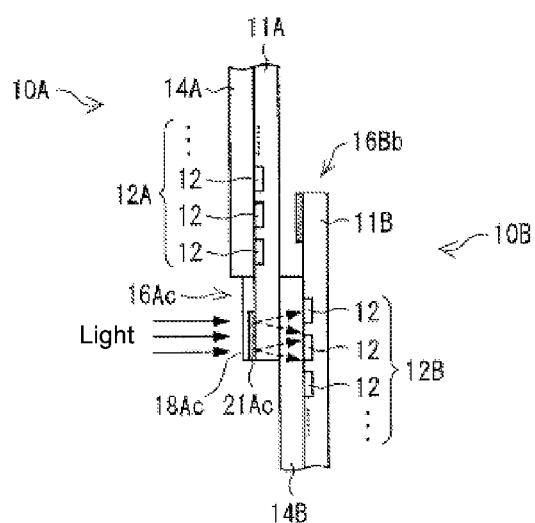
FIG. 5 is a drawing that shows a location where the above-mentioned light-receiving unit and a different light-receiving unit of the light-receiving device according to Embodiment 1 of the present invention are bonded together.

FIG. 5 is a drawing that shows where the light-receiving unit 10A and the light-receiving unit 10B according to the present embodiment are bonded together.

As shown in FIG. 5, the front surface of the cover glass 14B in the vicinity of the first terminal forming region 16Bb of the light-receiving unit 10B is bonded to the rear surface of the second terminal forming region 16Ac of the light-receiving unit 10A, for example.

As stated above, the second terminal forming region 16Ac of the light-receiving unit 10A is provided with: the light-receiving element control wiring lines $24_{x1}$, $24_{x2}$, ... $24_{xn-1}$, and $24_{xn}$, which extend from the connection pads PAc and cross the light-receiving element overlapping region 21Ac; and the vertical direction light-receiving element control wiring lines $24_{y1}$, $24_{y2}$, ... $24_{yn-1}$, and $24_{yn}$, which extend from the light-receiving element control wiring lines $24_{x1}$, $24_{x2}$, ... $24_{xn-1}$, and $24_{xn}$ along the direction in which the light-receiving element overlapping region 21Ac extends, or in other words, the direction in which the light-receiving element group 12A of the light-receiving unit 10A is aligned in the light-receiving element overlapping region 21Ac.

The light-receiving element control wiring lines $24_{x1}$, $24_{x2}$, ... $24_{xn-1}$, and $24_{xn}$ are formed thinner than the light-receiving element control wiring lines $24_{y1}$, $24_{y2}$, ... $24_{yn-1}$, and $24_{yn}$.

With this configuration, the amount of light blocked from entering the light-receiving element group 12B in the light-receiving unit 10B disposed in the light-receiving element overlapping region 21Ac as a result of the light-receiving element control wiring lines $24_{x1}$, $24_{x2}$, ... $24_{xn-1}$, and $24_{xn}$, which cross the light-receiving element overlapping region 21Ac, can be minimized. As a result, it is possible to mitigate a decrease in the light received by the light-receiving element group 12B of the light-receiving unit 10B disposed in the light-receiving element overlapping region 21Ac of the light-receiving unit 10A.

Even if approximately 2 to 3 mm of the second terminal forming region 16Ac of the light-receiving unit 10A and the first terminal forming region 16Bb of the light-receiving unit 10B were bonded together, it is possible to allow enough light to enter the part of the light-receiving element group 12B included in the region that is bonded together.

The light-receiving element control wiring lines $24_{x1}$, $24_{x2}$, ... $24_{xn-1}$, and $24_{xn}$ and the like, which cross the light-receiving element overlapping region 21Ac, are disposed in a layer below the lens 18Ac (between the lens 18Ac and the element substrate 11A).

The same is true with regard to drawing out of wiring lines that connect the light-receiving element group 12A for when the rear surface of the element substrate 11A of the first terminal forming region 16Ab of the light-receiving unit 10A is bonded to the cover glass 14B in the vicinity of the second terminal forming region 16Bc of the light-receiving unit 10B, to the connection pads PAb for connecting to the FPC 17A.

This is described with reference to FIG. 6.

Figure 6:
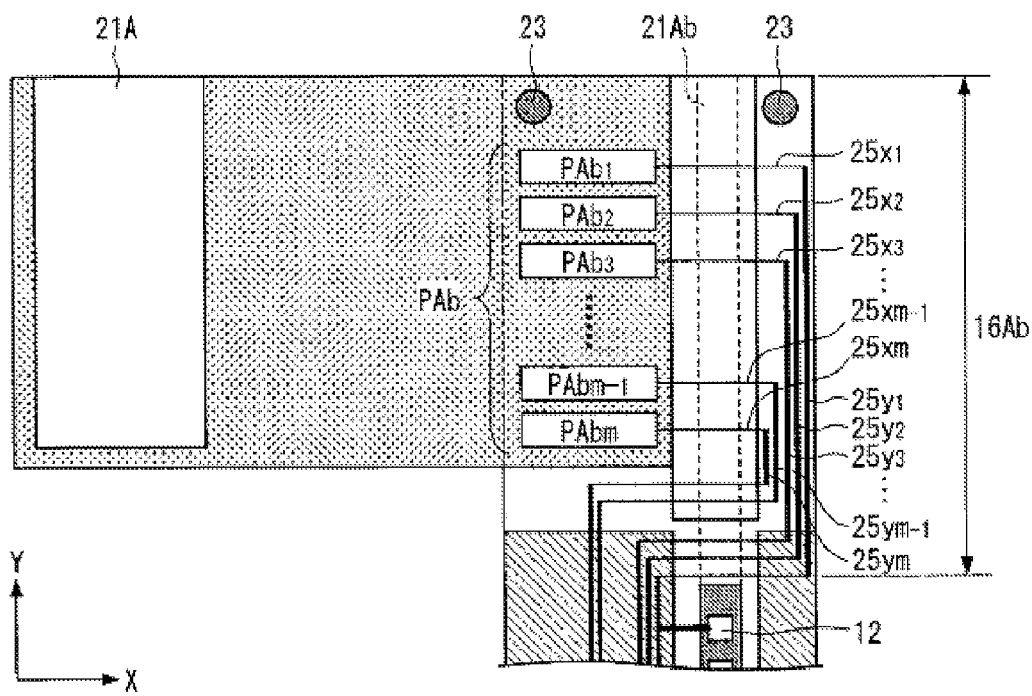
FIG. 6 is a drawing that shows a configuration of a first terminal forming region of the light-receiving unit.

FIG. 6 is a drawing that shows a configuration of the first terminal forming region 16Ab of the light-receiving unit 10A.

The connection pads PAb are constituted of the connection pads $PAb_1$, $PAb_2$, $PAb_3$, ... $PAb_{m-1}$, and $PAb_m$, which are aligned in the Y direction in this order.

Each connection pad $PAb_1$, $PAb_2$, $PAb_3$, ... $PAb_{m-1}$, and $PAb_m$ is connected to one terminal of each light-receiving element output wiring line (horizontal direction wiring line) $25_{x1}$, $25_{x2}$, $25_{x3}$, ... $25_{xm-1}$, and $25_{xm}$.

The light-receiving element output wiring lines $25_{x1}$, $25_{x2}$, $25_{x3}$, ... $25_{xm-1}$, and $25_{xm}$ cross the light-receiving element overlapping region 21Ab extending along the X direction and being disposed parallel to each other in the Y direction.

The width of the light-receiving element output wiring lines $25_{x1}$, $25_{x2}$, ... $25_{xm-1}$, and $25_{xm}$ is similar to the above-mentioned light-receiving element control wiring lines $24_{x1}$, $24_{x2}$, ..., and $24_{xn}$ in being thin at approximately 100 μm so as to allow light to enter the light-receiving element group 12B disposed in an overlapping manner on the rear surface side of the light-receiving element overlapping region 21Ab.

With this configuration, the light-receiving element output wiring lines $25_{x1}, 25_{x2}, \ldots 25_{xm-1}$, and $25_{xm}$ are provided with a wide gap therebetween, and thus, when disposing the light-receiving element group 12B in an overlapping manner on the rear surface side of the light-receiving element overlapping region 21Ab, the sensitivity of the light-receiving element group 12B to incident light can be prevented from decreasing.

The other terminals of the respective light-receiving element output wiring lines $25_{x1}, 25_{x2}, \ldots 25_{xm-1}$, and $25_{xm}$ are connected to terminals of respective light-receiving element output wiring lines (vertical direction wiring lines) $25_{y1}, 25_{y2}, 25_{y3}, \ldots 25_{ym-1}$, and $25_{ym}$.

The respective light-receiving element output wiring lines $25_{y1}, 25_{y2}, 25_{y3}, \ldots 25_{ym-1}$, and $25_{ym}$ extend in the Y direction and are disposed parallel to each other in the X direction. In other words, the respective light-receiving element output wiring lines $25_{y1}, 25_{y2}, 25_{y3}, \ldots 25_{ym-1}$, and $25_{ym}$ are disposed adjacent to the light-receiving element overlapping region 21Ab so as to extend along the direction that the light-receiving element overlapping region 21Ab extends.

The width of each of the light-receiving element output wiring lines $25_{y1}, 25_{y2}, 25_{y3}, \ldots 25_{ym-1}$, and $25_{ym}$ is approximately 50 μm to 500 μm, and preferably greater than 100 μm and no greater than 500 μm, so as to be wider than the light-receiving element output control wiring lines $25_{x1}, 25_{x2}$, and $25_{xn}$. With this configuration, it is possible to have the effect of reducing the resistance of the wiring lines.

In this manner, the Y direction light-receiving element output wiring lines $25_{y1}, 25_{y2}, 25_{y3}, \ldots 25_{ym-1}$, and $25_{ym}$, which are wide, do not enter the light-receiving element overlapping region 21Ab.

Where the respective light-receiving element output wiring lines $25_{y1}, 25_{y2}, 25_{y3}, \ldots 25_{ym-1}$, and $25_{ym}$, which extend from the one terminal in the Y direction (Y minus direction), reach beyond the position of the side part of the FPC 17A, the width of the wiring lines becomes the same as that of the light-receiving element output wiring lines $25_{x1}, 25_{x2}, \ldots 25_{xm-1}$, and $25_{xm}$, and the light-receiving element output wiring lines $25_{y1}, 25_{y2}, 25_{y3}, \ldots 25_{ym-1}$, and $25_{ym}$ are disposed so as to bend in a direction so as to cross the light-receiving element overlapping region 21Ab again.

Each of the light-receiving element output wiring lines $25_{y1}, 25_{y2}, 25_{y3}, \ldots 25_{ym-1}$, and $25_{ym}$, which cross the light-receiving element overlapping region 21Ab, becomes wide again at approximately 50 μm to 500 μm and preferably greater than 100 μm and no greater than 500 μm, and extends in the Y direction connecting to the output electrode of each light-receiving element 12.

In this manner, the first terminal forming region 16Ab of the light-receiving unit 10A is provided with the light-receiving element output wiring lines $25_{x1}, 25_{x2}, \ldots 25_{xm-1}$, and $25_{xm}$, which extend from the connection pads PAb and cross the light-receiving element overlapping region 21Ab, and the light-receiving element output wiring lines $25_{y1}, 25_{y2}, 25_{y3}, \ldots 25_{ym-1}$, and $25_{ym}$, which extend from the light-receiving element output wiring lines $25_{x1}, 25_{x2}, \ldots 25_{xm-1}$, and $25_{xm}$ along the direction in which the light-receiving element group 12B of the light-receiving unit 10B in the light-receiving element overlapping region 21Ab are aligned.

Compared to the light-receiving element output wiring lines $25_{y1}, 25_{y2}, 25_{y3}, \ldots 25_{ym-1}$, and $25_{ym}$, the light-receiving element output wiring lines $25_{x1}, 25_{x2}, \ldots 25_{xm-1}$, and $25_{xm}$ are thinner.

With this configuration, the amount of light blocked from entering the light-receiving element group 12B in the light-receiving unit 10B, which is disposed in the light-receiving element overlapping region 21Ab of the light-receiving unit 10A, as a result of the light-receiving element output wiring lines $25_{x1}, 25_{x2}, \ldots 25_{xm-1}$, and $25_{xm}$, which cross the light-receiving element overlapping region 21Ab, can be minimized. As a result, it is possible to mitigate a decrease in the amount of light received by the light-receiving element group 12B of the light-receiving unit 10B disposed in the light-receiving element overlapping region 21Ab of the light-receiving unit 10A.

Wiring lines that cross the light-receiving element overlapping region 21Ab such as the light-receiving element output wiring lines $25_{x1}, 25_{x2}, 25_{x3}, \ldots 25_{xm-1}$, and $25_{xm}$ are disposed in a layer below the lens 18Ab (between the lens 18Ab and the element substrate 11A).

The same is true with regard to drawing out the wiring lines that connect the light-receiving element group 12C for when the rear surface of the element substrate 11C of the first terminal forming region 16Cb of the light-receiving unit 10C is bonded to the cover glass 14B in the vicinity of the second terminal forming region 16Bc of the light-receiving unit 10B, to the connection pads PCb for connecting to the FPC 17C.

Embodiment 2

Next, a configuration of a light-receiving device 50 according to Embodiment 2 will be described with reference to FIGS. 7 and 8. For ease of description, members having the same functions as those in the drawings for Embodiment 1 are assigned the same reference characters and descriptions thereof will be omitted.

Figure 7:
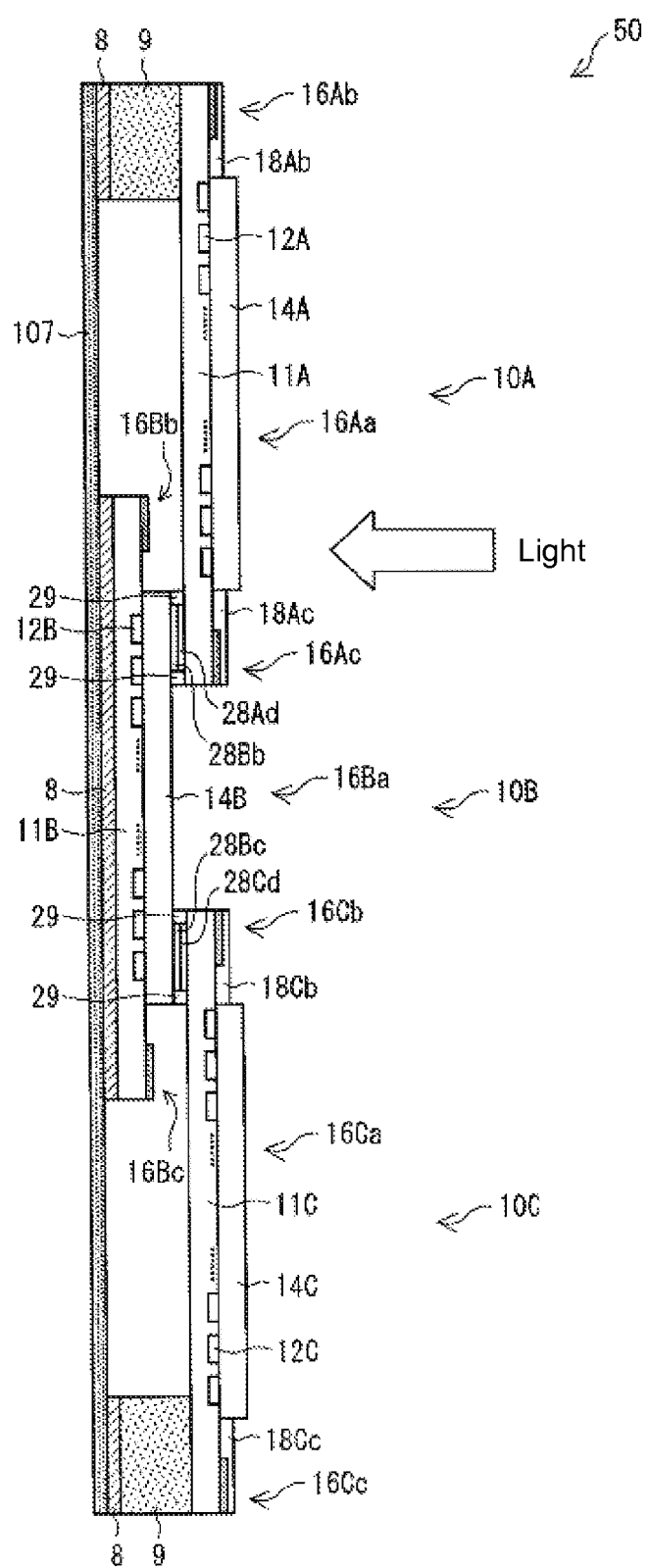
FIG. 7 is a cross-sectional view that shows a configuration of a light-receiving device according to Embodiment 2 of the present invention.

FIG. 7 is a cross-sectional view that shows a configuration of a light-receiving device 50 according to Embodiment 2.

The light-receiving device 50 differs from the light-receiving device 10 in that the light-receiving device 50 is provided with additional lenses in the region where a light-receiving unit 10A and a light-receiving unit 10B are bonded together, and the region where a light-receiving unit 10B and a light-receiving unit 10C are bonded together.

In the second terminal forming region 16Ac of the light-receiving unit 10A, a lenticular lens (second lens) 28Ad is provided on the rear surface of an element substrate 11A. The region facing the lens 28Ad, which is the front surface of a cover glass 14B of the light-receiving unit 10B, is also provided with a lenticular lens (third lens) 28Bb.

A spacer 29 is provided between the rear surface of the element substrate 11A of the light-receiving unit 10A and the front surface of the cover glass 14B of the light-receiving unit 10B. The rear surface of the element substrate 11A is bonded to the front surface of the cover glass 14B of the light-receiving unit 10B using the spacer 29.

In the first terminal forming region 16Cb of the light-receiving unit 10C, a lenticular lens (second lens) 28Cd is provided on the rear surface of an element substrate 11C. The region facing the lens 28Cd, which is the front surface of the cover glass 14B of the light-receiving unit 10B, is also provided with a lenticular lens (third lens) 28Bc.

The spacer 29 is provided between the rear surface of the element substrate 11C of the light-receiving unit 10C and the front surface of the cover glass 14B of the light-receiving unit 10B. The rear surface of the element substrate 11C and the front surface of the cover glass 14B of the light-receiving unit 10B are bonded together using the spacer 29.

Figure 8:
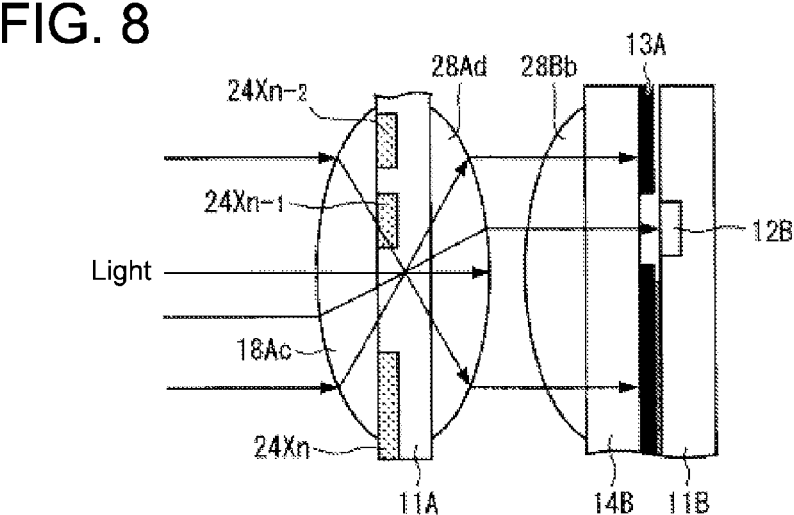
FIG. 8 is a drawing that shows a location where the above-mentioned light-receiving unit and a different light-receiving unit of the light-receiving device according to Embodiment 2 of the present invention are bonded together.

FIG. 8 is a drawing that shows a region where the light-receiving unit 10A and the light-receiving unit 10B of the light-receiving device 50 are bonded together.

As shown in FIG. 8, the lenses 18Ac, 28Ad, and 28Bd are formed on the front surface and rear surface of the element substrate 11A of the light-receiving unit 10A, and the front surface of the cover glass 14B of the light-receiving unit 10B. The lenses 18Ac, 28Ad, and 28Bd are lenticular lenses in which small convexities are present in a continuous fashion. The lenses 18Ac, 28Ad, and 28Bd are disposed such that the respective convexities correspond.

The lens 18Ac is formed so as to cover wiring lines such as light-receiving element control wiring lines $24_{x1}$, $24_{x2}$, ... $24_{xn-1}$, and $24_{xn}$, which are formed so as to cross the light-receiving element overlapping region 21Ac. The lens 18Ac is disposed such that the convexities thereof face the direction from which light enters.

The lens 28Ad is disposed on the rear surface of the element substrate 11A so as to correspond to the lens 18Ac, and the direction in which light, which is transmitted through the lens 18Ac, is emitted is the direction that the convexities of the lens 28Ad face.

The lens 28Bd is disposed on the front surface of the cover glass 14B so as to correspond to the lens 28Ad, and is disposed such that the convexities thereof face the direction from which light that is transmitted through the lens 28Ad enters. The direction that the convexities of the lenses 18Cb, 28Cd, and 28Bc face is set in a similar manner.

In this manner, the light-receiving device 50 is provided with lenticular lenses 18Ac and 28Ad on the front and rear surfaces of the second terminal forming region 16Ac of the element substrate 11A of the light-receiving unit 10A, and by disposing the lenticular lens 28Bb on the front surface of the cover glass 14B of the light-receiving unit 10B, it is possible to improve the usage efficiency of the light as well as form parallel beams thereof.

With this configuration, it is possible to improve the usage efficiency of the light that enters the light-receiving element group 12B disposed on the rear surface side of the second terminal forming region 16Ac. Therefore, of the light-receiving element group 12B disposed in the light-receiving unit 10B, the strength of the light entering the light-receiving elements 12 in the region overlapping with the light-receiving unit 10A can be made approximately the same as the strength of the light entering the light-receiving elements 12 that are not overlapping with the light-receiving unit 10A.

Therefore, it is possible to mitigate a decrease in the amount of light received in the light-receiving elements 12 in the region where the light-receiving unit 10A and the light-receiving unit 10B are bonded together. Also, similar effects can be attained in the region where the light-receiving unit 10C and the light-receiving unit 10B are bonded together.

In this manner, in the light-receiving device 50, the lens 28Ad is disposed on the rear surface of the element substrate 11A in the second terminal forming region 16Ac of the light-receiving unit 10A, and in addition, a lens 28Bb is disposed on the front surface of the cover glass 14B of the light-receiving unit 10B, which is the region facing the lens 28Ad.

In addition, the lens 28Cd is disposed on the rear surface of the element substrate 11C in the first terminal forming region 16Cb of the light-receiving unit 10C, and the lens 28Bc is disposed on the front surface of the cover glass 14B of the light-receiving unit 10B, which is the region facing the lens 28Cd.

According to the above-mentioned configuration, light is condensed and refracted as a result of the lenses 18Ac, 28Ad, and 28Bb, and lenses 18Cb, 28Cd, and 28Bc, thus mitigating a decrease in the amount of light received by the light-receiving element group 12B of the light-receiving unit 10B disposed in the light-receiving element overlapping region 21Ac of the light-receiving unit 10A and the light-receiving element overlapping region 21Cb of the light-receiving unit 10B.

Also, because the lenses 18Ac, 28Ad, and 28Bb, and lenses 18Cb, 28Cd, and 28Bc are lenticular lenses, the lenses 18Ac and 18Cb condense the light, and parallel beams of light can be formed between the lenses 28Ad and 28Cd, and the lenses 28Bb and 28Bc. Therefore, it is possible to further mitigate the decrease in the amount of light received by the light-receiving element group 12B of the light-receiving unit 10B disposed in the light-receiving element overlapping regions 21Ac and 21Cb.

Embodiment 3

Next, a light-receiving unit 55A according to Embodiment 3 will be described with reference to FIGS. 9 and 10.

For ease of description, members having the same functions as those in the drawings for Embodiments 1 and 2 are assigned the same reference characters and descriptions thereof will be omitted.

The present embodiment differs from the previous embodiments in that, in a light-receiving unit 55A, wiring lines that cross light-receiving element overlapping regions 21Ab and 21Ac of the light-receiving unit 10A are constituted of transparent electrodes, and in that the width of wiring lines that cross the light-receiving element overlapping regions 21Ab and 21Ac is equal to that of the wiring lines that extend in the Y direction.

Figure 9:
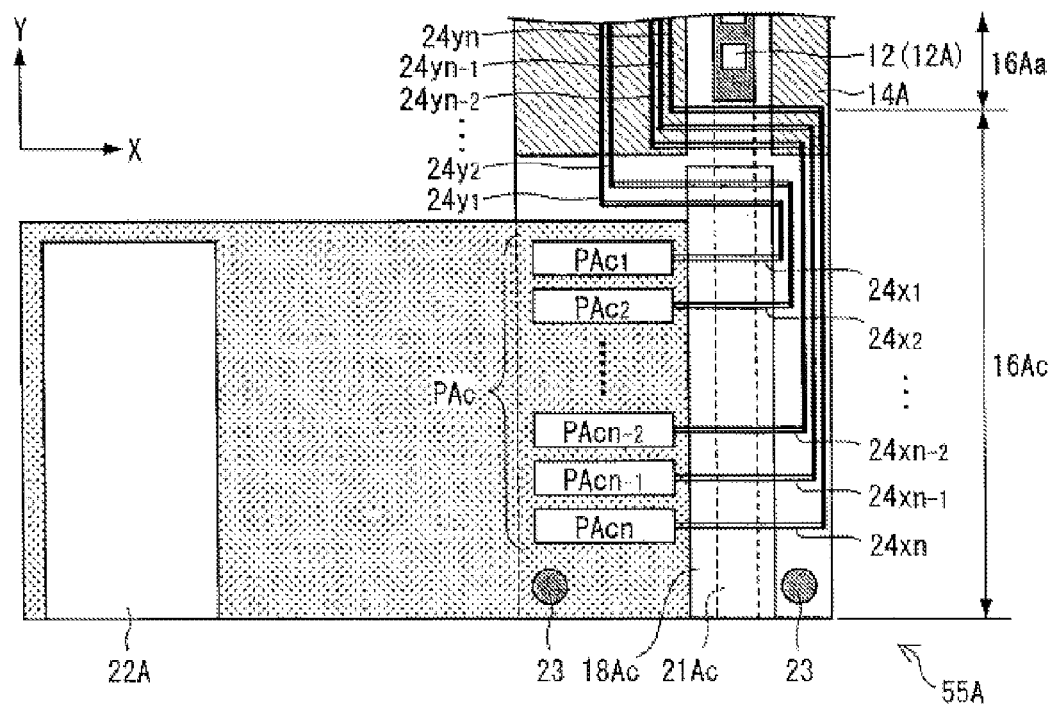
FIG. 9 is a drawing that shows a configuration of a second terminal forming region of a light-receiving unit that constitutes a light-receiving device according to Embodiment 3 of the present invention.

FIG. 9 is a drawing that shows a configuration of a second terminal forming region 16Ac of the light-receiving unit 55A. FIG. 10 is a drawing that shows a configuration of a first terminal forming region 16Ab of the light-receiving unit 55A.

Figure 10:
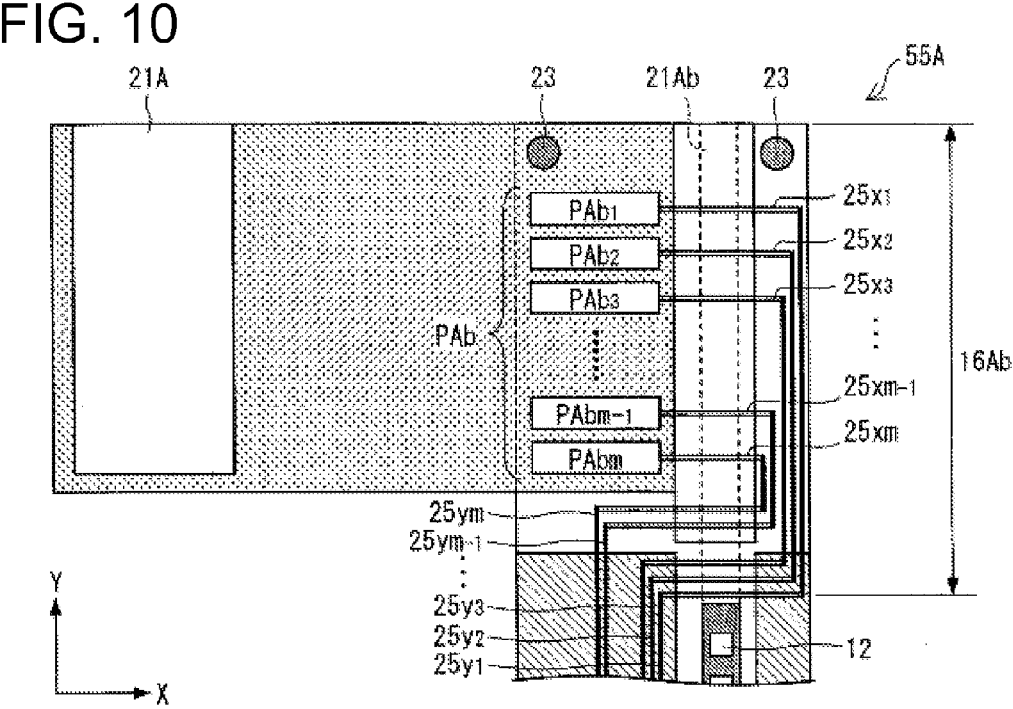
FIG. 10 is a drawing that shows a configuration of a first terminal forming region of a light-receiving unit constituting the light-receiving device according to Embodiment 3 of the present invention.

As shown in FIGS. 9 and 10, light-receiving element control wiring lines $24_{x1}$, $24_{x2}$, ... $24_{xn-1}$, and $24_{xn}$ and light-receiving element output wiring lines $25_{x1}$, $25_{x2}$, $25_{x3}$, ... $25_{xm-1}$, and $25_{xm}$ are made of a transparent electrode such as ITO.

The light-receiving element control wiring lines $24_{x1}$, $24_{x2}$, ... $24_{xn-1}$, and $24_{xn}$ and the light-receiving element output wiring lines $25_{x1}$, $25_{x2}$, $25_{x3}$, ... $25_{xm-1}$, and $25_{xm}$ have approximately the same width as light-receiving element control wiring lines $24_{y1}$, $24_{y2}$, ... $24_{yn-1}$, and $24_{yn}$ and light-receiving element output wiring lines $25_{y1}$, $25_{y2}$, $25_{y3}$, ... $25_{ym-1}$, and $25_{ym}$, which extend in the Y direction.

Also, wiring lines that bend from the light-receiving element control wiring lines $24_{y1}$, $24_{y2}$, ... $24_{yn-1}$, and $24_{yn}$ and the light-receiving element output wiring lines $25_{y1}$, $25_{y2}$, $25_{y3}$, ... $25_{ym-1}$, and $25_{ym}$, which extend in the Y direction, and that cross the respective light-receiving element overlapping regions 21Ab and 21Ac, are similarly made of transparent electrodes made of a material such as ITO, and have a similar width to the light-receiving element control wiring lines $24_{y1}$, $24_{y2}$, ... $24_{yn-1}$, and $24_{yn}$ and the light-receiving element output wiring lines $25_{y1}$, $25_{y2}$, $25_{y3}$, ... $25_{ym-1}$, and $25_{ym}$, which extend in the Y direction.

By making the wiring lines that cross the respective light-receiving element overlapping regions 21Ab and 21Ac out of transparent electrodes, it is possible to prevent the wires from blocking light that enters the light-receiving element group 12B of the light-receiving unit 10B disposed on the rear surface side of the element substrate 11A in the light-receiving element overlapping regions 21Ab and 21Ac, even if the wiring lines crossing the light-receiving element overlapping regions 21Ab and 21Ac are made wide. Thus, it is possible to reduce the resistance of the wiring lines while preventing a decrease in the sensitivity of the light-receiving element group 12B to incident light, thus mitigating a decrease in the amount of light received by the light-receiving element group 12B.

Embodiment 4

Next, a configuration of an optical touch panel device 150 according to Embodiment 4 will be described with reference to FIG. 11. For ease of description, members having the same functions as those in the drawings for Embodiments 1 to 3 are assigned the same reference characters and descriptions thereof will be omitted.

Figure 11:
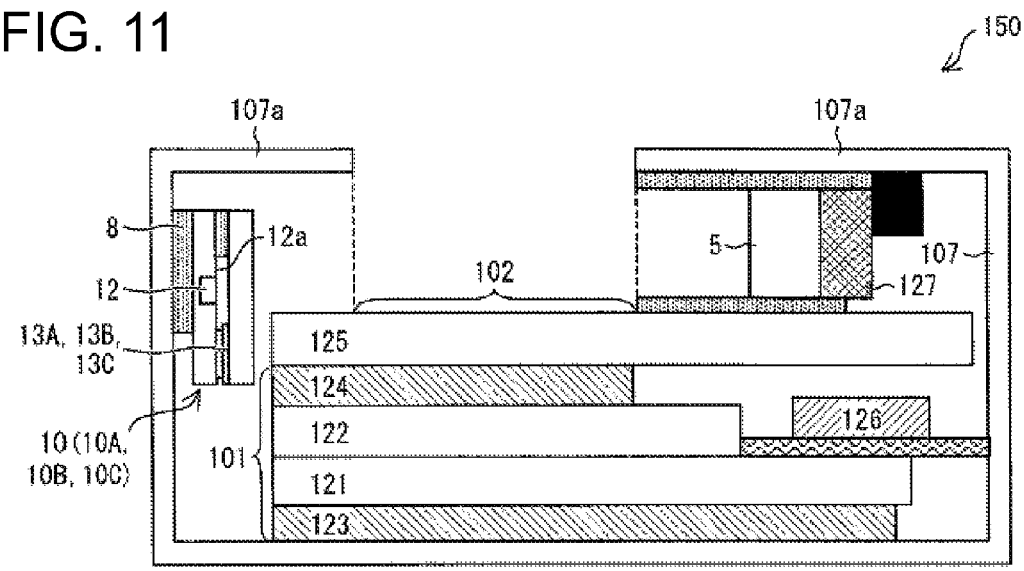
FIG. 11 is a cross-sectional drawing that shows a configuration of an optical touch panel device according to Embodiment 4 of the present invention.

FIG. 11 is a cross-sectional drawing that shows a configuration of the optical touch panel device 150 according to Embodiment 4.

The optical touch panel device 150 differs from the optical touch panel device 100 in that the direction of the light-receiving surface of the light-receiving device differs.

A display panel 101 is a liquid crystal display panel as in Embodiment 1. The display panel 101 is provided with at least: a TFT substrate 121 on which switching elements for driving pixels are formed; a CF substrate 122, which is disposed opposite to the TFT substrate 121 with liquid crystals between the TFT substrate 121 and the CF substrate 122, and has color filters (CF) disposed for each pixel; a rear polarizing plate 123 disposed on the rear surface of the TFT substrate 121; and a front polarizing plate 124 disposed on the front surface of the CF substrate 122. In addition, the front surface of the display panel 101 is provided with a protective plate 125 for protecting the display panel 101. The display panel 101 is connected to a driver 126 for controlling the driving of the display panel 101.

The display panel 101 is stored in a bezel 107, which has an opening in a region facing a coordinate input region 102 of the display panel 101. A light source 5 and a light-receiving device 10 are also provided in the bezel 107. The bezel 107 is approximately 0.5 mm in thickness.

The light source 5 is disposed between the protective plate 125 and an edge part 107a of the bezel 107 on the front surface of the protective plate 125. The light source 5 is made of a plurality of LEDs as stated above, and has a plurality of LEDs aligned on a ceramic substrate 127.

The direction that the light source 5 emits light is different from that of Embodiment 1 in being parallel to the display surface of the display panel 101.

In the light-receiving device 10, a light-receiving surface 12a of a light-receiving element 12 is disposed so as to be perpendicular to the image display surface of the display panel 101 and so as to be adjacent to the display panel 101. The light-receiving device 10 is disposed on the rear surface side of the edge part 107a of the bezel 107 and is fixed to a side of the bezel 107 using a RIM sheet 8 that is approximately 0.05 mm in thickness.

Light-receiving element groups 12A, 12B, and 12C of the respective light-receiving units 10A, 10B, and 10C of the light-receiving device 10 are disposed in a line so as to be parallel to the display surface of the display panel 101. The respective light-receiving units 10A, 10B, and 10C are disposed such that, of the regions where resin BMs 13A, 13B, and 13C are formed (non-sensor regions), the sides adjacent to the connection pads PAb, PAc, PBb, PBc, PCb, and PCc from the regions where the light-receiving element groups 12A, 12B, and 12C are each aligned in a line come below the front surface of the protective plate 125. With this configuration, it is possible to shorten the distance between the protective plate 125 and the edge part 107a. As a result, the difference in height between the opening part of the bezel 107 and the protective plate 125 can be minimized, and the edge part 107a can be made small.

In this manner, the optical touch panel device 150 is not provided with a reflective plate or the like, and the light emitted from the light source 5 enters the light-receiving elements 12 of the light-receiving device 10 directly. As a result, the strength of the light entering the light-receiving elements 12 can be made greater than when the light emitted from the light source 5 is reflected by a reflective plate and then enters the light-receiving elements 12.

The light-receiving device of the present invention needs only to be constituted of a plurality of light-receiving units bonded together, and the number of light-receiving units constituting the light-receiving device is not limited to three; the number of light-receiving units may be two, or four or greater.

The present invention is not limited to the embodiment described above, and various modifications can be made without departing from the scope of the claims. Therefore, embodiments obtained by appropriately combining the techniques disclosed in different embodiments are included in the technical scope of the present invention.

As mentioned above, the light-receiving device of the present invention includes a plurality of light-receiving units, in which each of the plurality of light-receiving units has: a plurality of light-receiving elements; first and second terminal forming regions respectively provided for forming first and second connection terminals for connecting first and second circuits to the plurality of light-receiving elements, respectively; and a light-receiving element forming region disposed between the first and second terminal forming regions, the light-receiving element forming region being provided for forming the plurality of light-receiving elements. Each of the plurality of light-receiving units is provided with a substrate and a protective member, and the plurality of light-receiving elements and the first and second connection terminals are formed on a front surface of the substrate. The protective member is disposed so as to cover the plurality of light-receiving elements, and a rear surface of the first or second terminal forming region in the substrate of one of the light-receiving units and a front surface of the protective member of a light-receiving unit that is different from the aforementioned one of the light-receiving units are bonded together.

According to the above-mentioned configuration, each of the plurality of light-receiving units has first and second terminal forming regions for respectively forming the first and second connection terminals to connect the first and second circuits to the plurality of light-receiving elements, and a light-receiving element forming region, which is disposed between the first and second terminal forming regions, for forming the plurality of light-receiving elements.

With this configuration, the plurality of light-receiving elements are formed on the light-receiving element forming region, and by forming the first connection terminal and the second connection terminal in the first terminal forming region and the second terminal forming region, respectively, it is possible to connect the plurality of light-receiving elements to the first and second circuits. With this configuration, it is possible to control the driving of the light-receiving element groups and control the output from the light-receiving element groups based on the first and second control circuits.

According to the above-mentioned configuration, the protective member is disposed so as to cover the plurality of light-receiving elements formed on the front surface of the substrate, and thus, it is possible to protect the plurality of light-receiving elements.

According to the above-mentioned configuration, the rear surface of the first or second terminal forming region in the substrate of the light-receiving unit and the front surface of the protective member of a different light-receiving unit are bonded together. Also, the first and second terminal forming regions are disposed with the light-receiving element forming region therebetween.

With this configuration, it is possible to dispose the respective light-receiving element forming regions so as to be adjacent when viewing the plurality of light-receiving units bonded to each other from a plan view, and thus, it is possible to dispose the plurality of light-receiving elements formed thereon so as to be adjacent to each other. With this configuration, it is possible to dispose the plurality of light-receiving elements so as to be continuous over a long distance.

Since the plurality of light-receiving units are bonded together, it is possible to mitigate a decrease in yield compared to when the same number of light-receiving elements are formed without bonding the light-receiving elements to each other, even if the number of light-receiving elements formed increases as a result of disposing the light-receiving elements continuously over a long distance.

According to the above-mentioned configuration, a plurality of light-receiving units are provided, and light-receiving element groups are formed in the respective plurality of light-receiving units. With this configuration, it is possible to mitigate a decrease in yield and configure a light-receiving device with light-receiving elements formed at a high density by forming light-receiving elements on each of the plurality of light-receiving units at a high density and bonding together the light-receiving units on which the light-receiving elements are formed at a high density.

Because it is possible to dispose the light-receiving elements at a high density in this manner, it is possible to mitigate a decrease in resolution, even without providing a member such as a lens to cover light-receiving surfaces of all light-receiving elements, for example. As a result, it is possible to mitigate an increase in manufacturing cost compared to when a member such as a lens is disposed to cover the light-receiving surfaces of all light-receiving elements.

The plurality of light-receiving elements are preferably aligned in the light-receiving element forming region. With the above-mentioned configuration, light that enters the light-receiving element forming region can be received by each of the plurality of light-receiving elements.

It is preferable that the plurality of light-receiving units include a first light-receiving unit and a second light-receiving unit, the first light-receiving unit having a rear surface of the substrate in the second terminal forming region bonded to another light-receiving unit, the second light-receiving unit having a front surface of the protective member bonded to the first light-receiving unit, and that the first light-receiving unit and the second light-receiving unit be bonded together such that the plurality of light-receiving elements disposed on the first light-receiving unit and the plurality of light-receiving elements disposed on the second light-receiving unit are in a line with a regular gap from a plan view.

According to the above-mentioned configuration it is possible to dispose a plurality of light-receiving elements continuously over a long distance.

It is preferable that each of the first and second terminal forming regions of the first light-receiving unit be provided with a light-receiving element overlapping region that is adjacent to the first or second connection terminal formed therein and that overlaps some of the plurality of light-receiving elements of the second light-receiving unit, and that some of the plurality of light-receiving elements of the second light-receiving unit are disposed in the light-receiving element overlapping region so as to overlap the region.

According to the above-mentioned configuration, it is possible to dispose some of the plurality of light-receiving elements of the second light-receiving unit so as not to overlap the first or second connection terminal of the first light-receiving unit because some of the plurality of light-receiving elements of the second light-receiving unit overlap the light-receiving element overlapping region that is disposed adjacent to the first or second connection terminal of the first light-receiving unit. With this configuration, it is possible to increase the amount of light received by the light-receiving elements of the second light-receiving unit disposed in the light-receiving element overlapping region of the first light-receiving unit.

It is preferable that horizontal direction wiring lines extending from the first or second connection terminal that is formed and crossing the light-receiving element overlapping region, and vertical direction wiring lines extending from the horizontal direction wiring lines in the direction in which the light-receiving elements of the second light-receiving unit are aligned in the light-receiving element forming region be disposed in each of the first and second terminal forming regions of the first light-receiving unit, and that the horizontal direction wiring lines be thinner than the vertical direction wiring lines.

According to the above-mentioned configuration, it is possible to reduce the amount of light blocked from entering the light-receiving elements of the second light-receiving unit disposed in the light-receiving element overlapping region of the first light-receiving unit as a result of the horizontal direction wiring lines disposed crossing the light-receiving element forming region. As a result, it is possible to mitigate a decrease in the amount of light received by the light-receiving element of the second light-receiving unit disposed in the light-receiving element overlapping region of the first light-receiving unit.

It is preferable that horizontal direction wiring lines crossing the light-receiving element overlapping region and extending from the first or second connection terminal that is formed be disposed in each of the first and second terminal forming regions of the first light-receiving unit, and that the horizontal direction wiring lines be made of a transparent material.

According to the above-mentioned configuration, it is possible to reduce the amount of light blocked by the horizontal direction wiring lines, and thus, it is possible to mitigate a decrease in the amount of light received by the light-receiving elements of the second light-receiving unit disposed in the light-receiving element overlapping region of the first light-receiving unit.

It is preferable that a first lens be disposed on the front surface of the substrate of the first light-receiving unit in the light-receiving element overlapping region of the first light-receiving unit. According to the above-mentioned configuration, light can be condensed using the first lens, and thus, it is possible to mitigate a decrease in the amount of light received by the light-receiving elements of the second light-receiving unit disposed in the light-receiving element overlapping region of the first light-receiving unit.

It is preferable that that a second lens be disposed on the rear surface of the substrate in the light-receiving element overlapping region of the substrate of the first light-receiving unit, and that a third lens be additionally disposed on the front surface of the protective member of the second light-receiving unit, in the region facing the second lens.

According to the above-mentioned configuration, light can be condensed and refracted using the first lenses, the second lenses, and the third lenses, thus mitigating a decrease in the amount of light received by the light-receiving elements of the second light-receiving unit disposed in the light-receiving element overlapping region of the first light-receiving unit.

It is preferable that the first lens, the second lens, and the third lens be lenticular lenses. According to the above-mentioned configuration, the light can be condensed by the first lens, and parallel beams of light can be formed between the second lens and the third lens, and thus, it is possible to further mitigate a decrease in the amount of light received by the light-receiving elements of the second light-receiving unit disposed in the light-receiving element overlapping region.

It is preferable that the rear surface of the second terminal forming region of the substrate of the first light-receiving unit and the front surface of the protective member of the second light-receiving unit be bonded together, and that a third light-receiving unit that is one of the plurality of light-receiving units be additionally provided, and the rear surface of the first terminal forming region of the substrate of the third light-receiving unit and the front surface of the protective member of the second light-receiving unit be bonded together.

According to the above-mentioned configuration, by providing the third light-receiving unit, it is possible to configure a light-receiving device in which light-receiving elements are disposed continuously over an even longer distance.

The optical touch panel device of the present invention includes the above-mentioned light-receiving device, a light source that emits light that enters the light-receiving device, and a display panel that displays images.

According to the above-mentioned configuration, light-receiving element groups are formed on respective light-receiving units bonded together, thus mitigating a decrease in yield and allowing the position to be detected at a high resolution.

Also, because the light-receiving elements are disposed in the light-receiving device continuously over a long distance, it is possible to expand the position input region.

It is preferable that light-receiving surfaces of the plurality of light-receiving elements of the light-receiving device be disposed so as to be parallel to an image display surface of the display panel, that the direction that the light from the light source is emitted be perpendicular to the image display surface of the display panel, and that the optical touch panel device include a light-receiving side reflective plate that covers the light-receiving surface and a light-receiving side reflective plate that covers the light-emitting surface.

According to the above-mentioned configuration, the light emitted from the light source can be received by the light-receiving elements of the light-receiving device by reflecting the light with the light-emitting side reflective plate and the light-receiving side reflective plate. It is possible to configure the optical touch panel device with this configuration.

It is preferable that the direction in which light is emitted from the light source be parallel to the image display surface of the display panel, and that the light-receiving surfaces of the plurality of light-receiving elements of the light-receiving device be disposed so as to be perpendicular to the image display surface of the display panel.

According to the above-mentioned configuration, the light emitted from the light source enters the light-receiving elements directly, and thus, it is possible to increase the strength of the light entering the light-receiving elements.

INDUSTRIAL APPLICABILITY

In the present invention, light-receiving elements are disposed at a high resolution and continuously over a long distance, and thus, the present invention is applicable as a touch panel that requires input positions to be detected accurately, and in particular, the present invention can be appropriately applied as a large touch panel with a large position input area.

DESCRIPTION OF REFERENCE CHARACTERS 5 light source
10, 50 light-receiving device
10A, 10B, 10C, 55A light-receiving unit
11A, 11B, 11C element substrate (substrate)
12 light-receiving element
12A, 12B, 12C light-receiving element group
14A, 14B, 14C cover glass (protective member)
16Aa, 16Ba, 16Ca light-receiving element forming region
16Ab, 16Bb, 16Cb first terminal forming region
16Ac, 16Bc, 16Cc second terminal forming region
18Ab, 18Ac lens (first lens)
28Ad, 28Cd lens (second lens)
28Bb, 28Bc lens (third lens)
$24_{y1}, 24_{y2}, \ldots 24_{yn}$ light-receiving element control wiring line (vertical direction wiring line)
$24_{x1}, 24_{x2}, \ldots 24_{xn-1}, 24_{xn}$ light-receiving element control wiring line (horizontal direction wiring line)
$25_{y1}, 25_{y2}, \ldots 25_{ym}$ light-receiving element output wiring line (vertical direction wiring line)
$25_{x1}, 25_{x2}, \ldots 25_{xm}$, light-receiving element output wiring line (horizontal direction wiring line)
100, 150 optical touch panel device
101 display panel
105 light-emitting side reflective plate
110 light-receiving side reflective plate
13A, 13B, 13C resin BM
21A ADC-IC (first circuit)
22A sensor control IC (second circuit)
PAb, PBb, PCb connection pad (first connection terminal)
PAc, PBc, PCc connection pad (second connection terminal)

The invention claimed is:
1. A light-receiving device, comprising a plurality of light-receiving units,
wherein each of the plurality of light-receiving units comprises:
a plurality of light-receiving elements;
first and second terminal forming regions respectively provided for forming first and second connection terminals for connecting first and second circuits to the plurality of light-receiving elements, respectively; and
a light-receiving element forming region disposed between the first and second terminal forming regions, the light-receiving element forming region being provided for forming the plurality of light-receiving elements,
wherein each of the plurality of light-receiving units comprises a substrate and a protective member,
wherein the plurality of light-receiving elements and the first and second connection terminals are formed on a front surface of the substrate, wherein the protective member is disposed so as to cover the plurality of light-receiving elements, wherein a rear surface of the first or second terminal forming region in the substrate of one of the light-receiving units and a front surface of the protective member of a light-receiving unit that is different from said one of the light-receiving units are bonded together, wherein the plurality of light-receiving elements are aligned in the light-receiving element forming region, wherein the plurality of light-receiving units comprise a first light-receiving unit and a second light-receiving unit, the first light-receiving unit having a rear surface of the substrate thereof in the second terminal forming region bonded to another light-receiving unit, the second light-receiving unit having a front surface of the protective member bonded to said first light-receiving unit, and wherein the first light-receiving unit and the second light-receiving unit are bonded together such that the plurality of light-receiving elements disposed on the first light-receiving unit and the plurality of light-receiving elements disposed on the second light-receiving unit are in a line with a regular gap from a plan view.

2. The light-receiving device according to claim 1, wherein each of the first and second terminal forming regions of the first light-receiving unit is provided with a light-receiving element overlapping region that is adjacent to the first or second connection terminal formed therein and that overlaps some of the plurality of light-receiving elements of the second light-receiving unit, and some of the plurality of light-receiving elements of the second light-receiving unit are disposed in the light-receiving element overlapping region so as to overlap said region.

3. The light-receiving device according to claim 2, comprising:

in each of the first and second terminal forming regions of the first light-receiving unit, horizontal direction wiring lines extending from the first or second connection terminal that is formed therein and crossing the light-receiving element overlapping region; and vertical direction wiring lines extending from the horizontal direction wiring lines in the direction in which the light-receiving elements of the second light-receiving unit are aligned in the light-receiving element forming region are disposed, wherein the horizontal direction wiring lines are thinner than the vertical direction wiring lines.

4. The light-receiving device according to claim 2, comprising:

in each of the first and second terminal forming regions of the first light-receiving unit, horizontal direction wiring lines crossing the light-receiving element overlapping region and extending from the first or second connection terminal that is formed therein are disposed, wherein the horizontal direction wiring lines are made of a transparent material.

5. The light-receiving device according to claim 2, further comprising a first lens disposed on a front surface of the substrate in the light-receiving element overlapping region of the first light-receiving unit.

6. The light-receiving device according to claim 5, further comprising:

a second lens disposed on the rear surface of the substrate in the light-receiving element overlapping region of the first light-receiving unit; and a third lens disposed on the front surface of the protective member of the second light-receiving unit in the region facing the second lens.

7. The light-receiving device according to claim 6, wherein the first lens, the second lens, and the third lens are lenticular lenses.

8. The light-receiving device according to claim 1, wherein the rear surface of the second terminal forming region of the substrate of the first light-receiving unit and the front surface of the protective member of the second light-receiving unit are bonded together, and wherein the light-receiving device further comprises a third light-receiving unit provided as one of the plurality of light-receiving units, the third light-receiving unit having the rear surface of the substrate in the first terminal forming region bonded to the front surface of the protective member of the second light-receiving unit.

9. An optical touch panel device, comprising: the light-receiving device according to claim 1; a light source that emits light that enters the light-receiving device; and a display panel that displays images.

10. The optical touch panel device according to claim 9, wherein light-receiving surfaces of the plurality of light-receiving elements of the light-receiving device and the light-emitting surface of the light source are disposed so as to be parallel to an image display surface of the display panel, and wherein the optical touch panel device comprises a light-receiving side reflective plate that covers the light-receiving surfaces and a light-emitting side reflective plate that covers the light-emitting surface.

11. The optical touch panel device according to claim 9, wherein the direction in which light is emitted from the light source is parallel to the image display surface of the display panel, and the light-receiving surfaces of the plurality of light-receiving elements of the light-receiving device are disposed so as to be perpendicular to the image display surface of the display panel.

* * * * *